(12) United States Patent
Hanson et al.

(10) Patent No.: US 9,017,452 B2
(45) Date of Patent: Apr. 28, 2015

(54) SYSTEM AND METHOD FOR DENSE PHASE SORBENT INJECTION

(71) Applicant: ADA-ES, Inc., Highlands Ranch, CO (US)

(72) Inventors: Ronald D. Hanson, Littleton, CO (US); Cameron E. Martin, Denver, CO (US); Robert W. Wewer, Evergreen, CO (US); Randall J. Boerema, Highlands Ranch, CO (US); Tyler J. Derritt, Denver, CO (US); Nicole M. McCann, Golden, CO (US)

(73) Assignee: ADA-ES, Inc., Highlands Ranch, CO (US)

( * ) Notice: Subject to any disclaimer, the term of this patent is extended or adjusted under 35 U.S.C. 154(b) by 72 days.

(21) Appl. No.: 13/676,365

(22) Filed: Nov. 14, 2012

(65) Prior Publication Data

US 2013/0139683 A1 Jun. 6, 2013

Related U.S. Application Data

(60) Provisional application No. 61/559,557, filed on Nov. 14, 2011.

(51) Int. Cl.
| | | |
|---|---|---|
| *B01D 53/02* | (2006.01) | |
| *B01D 53/08* | (2006.01) | |
| *B01D 53/83* | (2006.01) | |
| *B01D 53/90* | (2006.01) | |
| *B01D 53/40* | (2006.01) | |

(52) U.S. Cl.
CPC .............. *B01D 53/08* (2013.01); *B01D 53/40* (2013.01); *B01D 53/83* (2013.01); *B01D 53/90* (2013.01); *B01D 2257/602* (2013.01); *B01D 2258/0283* (2013.01); *B01D 2259/128* (2013.01)

(58) Field of Classification Search
USPC ....................... 95/107; 110/203, 345; 423/210
See application file for complete search history.

(56) References Cited

U.S. PATENT DOCUMENTS

| | | |
|---|---|---|
| 174,348 A | 3/1876 | Brown |
| 202,092 A | 4/1878 | Breed |
| 208,011 A | 9/1878 | Eaton |
| 224,649 A | 2/1880 | Child |
| 229,159 A | 6/1880 | McCarty |
| 298,727 A | 5/1884 | Case |
| 346,765 A | 8/1886 | McIntyre |
| 347,078 A | 8/1886 | White |
| 367,014 A | 7/1887 | Wandrey et al. |
| 537,998 A | 4/1895 | Spring et al. |

(Continued)

FOREIGN PATENT DOCUMENTS

| | | |
|---|---|---|
| AU | 2003/220713 | 2/2004 |
| CA | 1140572 | 2/1983 |

(Continued)

OTHER PUBLICATIONS

"ADA-ES Tests New Boiler Product," Coal Daily, Apr. 18, 2000, 1 page.

(Continued)

*Primary Examiner* — Christopher P Jones
(74) *Attorney, Agent, or Firm* — Sheridan Ross P.C.

(57) ABSTRACT

The present disclosure is directed to a dense-phase additive transportation system for additive injection into a contaminated gas stream.

16 Claims, 7 Drawing Sheets

(56) References Cited

U.S. PATENT DOCUMENTS

| | | |
|---|---|---|
| 541,025 A | 6/1895 | Gray |
| 625,754 A | 5/1899 | Garland |
| 647,622 A | 4/1900 | Vallet-Rogez |
| 685,719 A | 10/1901 | Harris |
| 688,782 A | 12/1901 | Hillery |
| 700,888 A | 5/1902 | Battistini |
| 744,908 A | 11/1903 | Dallas |
| 846,338 A | 3/1907 | McNamara |
| 894,110 A | 7/1908 | Bloss |
| 896,876 A | 8/1908 | Williams |
| 911,960 A | 2/1909 | Ellis |
| 945,331 A | 1/1910 | Koppers |
| 945,846 A | 1/1910 | Hughes |
| 1,112,547 A | 10/1914 | Morin |
| 1,167,471 A | 1/1916 | Barba |
| 1,167,472 A | 1/1916 | Barba |
| 1,183,445 A | 5/1916 | Foxwell |
| 1,788,466 A | 1/1931 | Lourens |
| 1,955,574 A | 4/1934 | Benner et al. |
| 1,984,164 A | 12/1934 | Stock |
| 2,016,821 A | 10/1935 | Nelms |
| 2,059,388 A | 11/1936 | Nelms |
| 2,089,599 A | 8/1937 | Crecelius |
| 2,511,288 A | 6/1950 | Morrell et al. |
| 2,844,112 A | 7/1958 | Muller |
| 3,004,836 A | 10/1961 | Thompson |
| 3,194,629 A | 7/1965 | Dreibelbis et al. |
| 3,288,576 A | 11/1966 | Pierron et al. |
| 3,332,755 A | 7/1967 | Kukin |
| 3,437,476 A | 4/1969 | Dotson et al. |
| 3,557,020 A | 1/1971 | Shindo et al. |
| 3,599,610 A | 8/1971 | Spector |
| 3,628,727 A | 12/1971 | Gjerde |
| 3,662,523 A | 5/1972 | Revoir et al. |
| 3,725,530 A | 4/1973 | Kawase et al. |
| 3,764,496 A | 10/1973 | Hultman et al. |
| 3,803,803 A | 4/1974 | Raduly et al. |
| 3,823,676 A | 7/1974 | Cook et al. |
| 3,838,190 A | 9/1974 | Birke et al. |
| 3,849,267 A | 11/1974 | Hilgen et al. |
| 3,849,537 A | 11/1974 | Allgulin |
| 3,896,746 A | 7/1975 | Pirsh |
| 3,907,674 A | 9/1975 | Roberts et al. |
| 3,932,494 A | 1/1976 | Yoshida et al. |
| 3,947,354 A | 3/1976 | Swanson et al. |
| 3,956,458 A | 5/1976 | Anderson |
| 3,961,020 A | 6/1976 | Seki |
| 3,970,434 A | 7/1976 | Gasior et al. |
| 3,974,254 A | 8/1976 | de la Cuadra Herrera et al. |
| 4,040,802 A | 8/1977 | Deitz et al. |
| 4,042,664 A | 8/1977 | Cardwell et al. |
| 4,051,316 A | 9/1977 | Wing et al. |
| 4,057,398 A | 11/1977 | Bennett |
| 4,075,282 A | 2/1978 | Storp et al. |
| 4,083,783 A | 4/1978 | Wing et al. |
| 4,089,507 A | 5/1978 | Arai et al. |
| 4,094,777 A | 6/1978 | Sugier et al. |
| 4,101,631 A | 7/1978 | Ambrosini et al. |
| 4,115,518 A | 9/1978 | Delmon et al. |
| 4,133,759 A * | 1/1979 | Ikeda et al. ................... 210/104 |
| 4,148,613 A | 4/1979 | Myers |
| 4,173,454 A | 11/1979 | Heins |
| 4,174,373 A | 11/1979 | Yoshida et al. |
| 4,196,173 A | 4/1980 | DeJong et al. |
| 4,226,601 A | 10/1980 | Smith |
| 4,230,460 A | 10/1980 | Maust, Jr. |
| 4,233,274 A | 11/1980 | Allgulin |
| 4,238,329 A | 12/1980 | Zievers |
| 4,272,250 A | 6/1981 | Burk, Jr. et al. |
| 4,276,431 A | 6/1981 | Schnegg et al. |
| 4,280,817 A | 7/1981 | Chauhan et al. |
| 4,305,726 A | 12/1981 | Brown, Jr. |
| 4,308,241 A | 12/1981 | deVries |
| 4,308,242 A | 12/1981 | Horton |
| 4,322,218 A | 3/1982 | Nozaki |
| 4,364,818 A | 12/1982 | Schmid et al. |
| 4,372,227 A | 2/1983 | Mahoney et al. |
| 4,377,118 A | 3/1983 | Sadowski |
| 4,377,599 A | 3/1983 | Willard, Sr. |
| 4,385,891 A | 5/1983 | Ligotti |
| 4,387,653 A | 6/1983 | Voss |
| 4,394,354 A | 7/1983 | Joyce |
| 4,420,892 A | 12/1983 | Braun et al. |
| 4,427,630 A | 1/1984 | Aibe et al. |
| 4,438,709 A | 3/1984 | Borio et al. |
| 4,440,100 A | 4/1984 | Michelfelder et al. |
| 4,472,278 A | 9/1984 | Suzuki |
| 4,474,896 A | 10/1984 | Chao |
| 4,498,402 A | 2/1985 | Kober et al. |
| 4,500,327 A | 2/1985 | Nishino et al. |
| 4,514,256 A | 4/1985 | Kober et al. |
| 4,519,807 A | 5/1985 | Nishino et al. |
| 4,519,995 A | 5/1985 | Schrofelbauer et al. |
| 4,527,746 A | 7/1985 | Molls et al. |
| 4,552,076 A | 11/1985 | McCartney |
| 4,555,392 A | 11/1985 | Steinberg |
| 4,564,374 A | 1/1986 | Hofmann |
| 4,572,085 A | 2/1986 | Hepworth |
| 4,577,566 A | 3/1986 | Merrell |
| 4,578,256 A | 3/1986 | Nishino et al. |
| 4,582,936 A | 4/1986 | Ashina et al. |
| 4,586,443 A | 5/1986 | Burge et al. |
| 4,598,652 A | 7/1986 | Hepworth |
| 4,602,918 A | 7/1986 | Steinberg et al. |
| 4,629,721 A | 12/1986 | Ueno |
| 4,668,429 A | 5/1987 | Najjar |
| 4,671,804 A | 6/1987 | Najjar |
| 4,693,731 A | 9/1987 | Tarakad et al. |
| 4,706,579 A | 11/1987 | Merrell |
| 4,708,853 A | 11/1987 | Matviya et al. |
| 4,716,137 A | 12/1987 | Lewis |
| 4,729,882 A | 3/1988 | Ide et al. |
| 4,741,278 A | 5/1988 | Franke et al. |
| 4,753,632 A | 6/1988 | Hofmann et al. |
| 4,758,418 A | 7/1988 | Yoo et al. |
| 4,764,219 A | 8/1988 | Yan |
| 4,765,258 A | 8/1988 | Zauderer |
| 4,784,670 A | 11/1988 | Najjar |
| 4,786,483 A | 11/1988 | Audeh |
| 4,796,548 A | 1/1989 | Merrell et al. |
| 4,804,521 A | 2/1989 | Rochelle et al. |
| 4,807,542 A | 2/1989 | Dykema |
| 4,824,441 A | 4/1989 | Kindig |
| 4,830,829 A | 5/1989 | Craig, Jr. |
| 4,831,942 A | 5/1989 | Morimoto et al. |
| 4,843,980 A | 7/1989 | Markham et al. |
| 4,873,930 A | 10/1989 | Egense et al. |
| 4,886,519 A | 12/1989 | Hayes et al. |
| 4,886,521 A | 12/1989 | Khan |
| 4,889,698 A | 12/1989 | Moller et al. |
| 4,892,567 A | 1/1990 | Yan |
| 4,895,603 A | 1/1990 | Semp et al. |
| 4,915,818 A | 4/1990 | Yan |
| 4,917,862 A | 4/1990 | Kraw et al. |
| 4,919,826 A | 4/1990 | Alzner |
| 4,933,158 A | 6/1990 | Aritsuka et al. |
| 4,936,047 A | 6/1990 | Feldmann et al. |
| 4,940,010 A | 7/1990 | Kubin et al. |
| 4,964,889 A | 10/1990 | Chao |
| 5,001,994 A | 3/1991 | Morimoto et al. |
| 5,013,358 A | 5/1991 | Ball et al. |
| 5,017,135 A | 5/1991 | Meyer |
| 5,022,329 A | 6/1991 | Rackley et al. |
| 5,024,171 A | 6/1991 | Krigmont et al. |
| 5,046,265 A | 9/1991 | Kalb |
| 5,049,163 A | 9/1991 | Huang et al. |
| 5,052,312 A | 10/1991 | Rackley et al. |
| 5,114,578 A | 5/1992 | Sundström |
| 5,116,793 A | 5/1992 | Chao et al. |
| 5,124,135 A | 6/1992 | Girrbach et al. |
| 5,126,300 A | 6/1992 | Pinnavaia et al. |
| 5,137,854 A | 8/1992 | Segawa et al. |
| 5,141,724 A | 8/1992 | Audeh et al. |
| 5,162,598 A | 11/1992 | Hutchings et al. |

(56) References Cited

U.S. PATENT DOCUMENTS

| | | |
|---|---|---|
| 5,179,058 A | 1/1993 | Knoblauch et al. |
| 5,190,566 A | 3/1993 | Sparks et al. |
| 5,196,648 A | 3/1993 | Jones |
| 5,202,301 A | 4/1993 | McNamara |
| 5,207,164 A | 5/1993 | Breen et al. |
| 5,209,062 A | 5/1993 | Vollenweider |
| 5,238,488 A | 8/1993 | Wilhelm |
| 5,282,430 A | 2/1994 | Nehls, Jr. |
| 5,288,306 A | 2/1994 | Aibe et al. |
| 5,307,743 A | 5/1994 | Jones |
| 5,313,915 A | 5/1994 | McDowell et al. |
| 5,320,051 A | 6/1994 | Nehls, Jr. |
| 5,320,817 A | 6/1994 | Hardwick et al. |
| 5,324,336 A | 6/1994 | Child |
| 5,328,673 A | 7/1994 | Kaczur et al. |
| 5,333,558 A | 8/1994 | Lees, Jr. |
| 5,336,835 A | 8/1994 | McNamara |
| 5,342,592 A | 8/1994 | Peter-Hoblyn et al. |
| 5,346,674 A | 9/1994 | Weinwurm et al. |
| 5,350,728 A | 9/1994 | Cameron et al. |
| 5,352,647 A | 10/1994 | Suchenwirth |
| 5,354,363 A | 10/1994 | Brown, Jr. et al. |
| 5,357,002 A | 10/1994 | Lezzi et al. |
| 5,364,421 A | 11/1994 | Westby et al. |
| 5,368,617 A | 11/1994 | Kindig |
| 5,372,619 A | 12/1994 | Greinke et al. |
| 5,379,902 A | 1/1995 | Wen et al. |
| 5,403,548 A | 4/1995 | Aibe et al. |
| 5,409,522 A | 4/1995 | Durham et al. |
| 5,435,980 A | 7/1995 | Felsvang et al. |
| 5,447,703 A | 9/1995 | Baer et al. |
| 5,460,643 A | 10/1995 | Hasenpusch et al. |
| 5,505,746 A | 4/1996 | Chriswell et al. |
| 5,505,766 A | 4/1996 | Chang |
| 5,569,436 A | 10/1996 | Lerner |
| 5,571,490 A | 11/1996 | Bronicki et al. |
| 5,575,982 A | 11/1996 | Reiss et al. |
| 5,577,910 A | 11/1996 | Holland |
| 5,587,003 A | 12/1996 | Bulow et al. |
| 5,607,496 A | 3/1997 | Brooks |
| 5,613,851 A | 3/1997 | Trawöger et al. |
| 5,618,508 A | 4/1997 | Suchenwirth et al. |
| 5,635,150 A | 6/1997 | Coughlin |
| 5,658,487 A | 8/1997 | Carey et al. |
| 5,659,100 A | 8/1997 | Lin |
| 5,670,122 A | 9/1997 | Zamansky et al. |
| 5,672,323 A | 9/1997 | Bhat et al. |
| 5,678,959 A | 10/1997 | Griffard et al. |
| 5,679,259 A | 10/1997 | Bolser |
| 5,695,726 A | 12/1997 | Lerner |
| 5,733,360 A | 3/1998 | Feldman et al. |
| 5,733,516 A | 3/1998 | DeBerry |
| 5,738,834 A | 4/1998 | DeBerry |
| 5,741,397 A | 4/1998 | Kraver |
| 5,785,932 A | 7/1998 | Helfritch |
| 5,787,823 A | 8/1998 | Knowles |
| 5,795,159 A | 8/1998 | Ralls et al. |
| 5,797,742 A | 8/1998 | Fraker |
| 5,809,911 A | 9/1998 | Feizollahi |
| 5,810,910 A | 9/1998 | Ludwig et al. |
| 5,819,672 A | 10/1998 | Radway et al. |
| 5,827,352 A | 10/1998 | Altman et al. |
| 5,855,649 A | 1/1999 | Durham et al. |
| 5,871,703 A | 2/1999 | Alix et al. |
| 5,885,076 A | 3/1999 | Ralls et al. |
| 5,888,256 A | 3/1999 | Morrison |
| 5,893,943 A | 4/1999 | Durham et al. |
| 5,894,806 A | 4/1999 | Smyrniotis et al. |
| 5,897,688 A | 4/1999 | Voogt et al. |
| 5,899,678 A | 5/1999 | Thomson et al. |
| 5,900,042 A | 5/1999 | Mendelsohn et al. |
| 5,910,292 A | 6/1999 | Alvarez, Jr. et al. |
| 5,972,066 A | 10/1999 | Lehtinen |
| 5,989,506 A | 11/1999 | Markovs |
| 6,022,216 A | 2/2000 | Cattani |
| 6,024,931 A | 2/2000 | Hanulik |
| 6,027,551 A | 2/2000 | Hwang et al. |
| 6,027,552 A | 2/2000 | Ruck et al. |
| 6,083,289 A | 7/2000 | Ono et al. |
| 6,083,306 A | 7/2000 | Cattani |
| 6,117,403 A | 9/2000 | Alix et al. |
| 6,132,692 A | 10/2000 | Alix et al. |
| 6,136,281 A | 10/2000 | Meischen et al. |
| 6,136,749 A | 10/2000 | Gadkaree |
| 6,139,751 A | 10/2000 | Bogaert et al. |
| 6,165,366 A | 12/2000 | Sarangapani |
| 6,200,543 B1 | 3/2001 | Allebach et al. |
| 6,206,685 B1 | 3/2001 | Zamansky et al. |
| 6,221,001 B1 | 4/2001 | Comer et al. |
| 6,240,859 B1 | 6/2001 | Jones, Jr. |
| 6,248,217 B1 | 6/2001 | Biswas et al. |
| 6,250,235 B1 | 6/2001 | Oehr et al. |
| 6,258,334 B1 | 7/2001 | Gadkaree et al. |
| 6,258,456 B1 | 7/2001 | Meyer |
| 6,267,802 B1 | 7/2001 | Baldrey et al. |
| 6,284,199 B1 | 9/2001 | Downs et al. |
| 6,284,208 B1 | 9/2001 | Thomassen |
| 6,328,939 B1 | 12/2001 | Amrhein |
| 6,368,511 B1 | 4/2002 | Weissenberg et al. |
| 6,372,187 B1 | 4/2002 | Madden et al. |
| 6,375,909 B1 | 4/2002 | Dangtran et al. |
| 6,401,449 B1 | 6/2002 | Hofmann et al. |
| 6,447,740 B1 | 9/2002 | Caldwell et al. |
| 6,471,506 B1 | 10/2002 | Zamansky et al. |
| 6,475,451 B1 | 11/2002 | Leppin et al. |
| 6,475,461 B1 | 11/2002 | Ohsaki et al. |
| 6,484,651 B1 | 11/2002 | Shepard, Jr. et al. |
| 6,514,907 B2 | 2/2003 | Tsutsumi et al. |
| 6,521,021 B1 | 2/2003 | Pennline et al. |
| 6,524,371 B2 | 2/2003 | El-Shoubary et al. |
| 6,528,030 B2 | 3/2003 | Madden et al. |
| 6,533,842 B1 | 3/2003 | Maes et al. |
| 6,547,874 B2 | 4/2003 | Eck et al. |
| 6,558,454 B1 | 5/2003 | Chang et al. |
| 6,582,497 B1 | 6/2003 | Maes et al. |
| 6,589,318 B2 | 7/2003 | El-Shoubary et al. |
| 6,595,848 B1 | 7/2003 | Robinson |
| 6,610,263 B2 | 8/2003 | Pahlman et al. |
| 6,613,110 B2 | 9/2003 | Sanyal |
| 6,638,347 B2 | 10/2003 | El-Shoubary et al. |
| 6,638,485 B1 | 10/2003 | Iida et al. |
| 6,649,082 B2 | 11/2003 | Hayasaka et al. |
| 6,719,828 B1 | 4/2004 | Lovell et al. |
| 6,726,888 B2 | 4/2004 | Lanier et al. |
| 6,729,248 B2 | 5/2004 | Johnson et al. |
| 6,732,055 B2 | 5/2004 | Bagepalli et al. |
| 6,737,031 B2 | 5/2004 | Beal et al. |
| 6,773,471 B2 | 8/2004 | Johnson et al. |
| 6,787,742 B2 | 9/2004 | Kansa et al. |
| 6,790,420 B2 | 9/2004 | Breen et al. |
| 6,790,429 B2 | 9/2004 | Ciampi |
| 6,808,692 B2 | 10/2004 | Oehr |
| 6,827,837 B2 | 12/2004 | Minter |
| 6,841,513 B2 | 1/2005 | El-Shoubary et al. |
| 6,848,374 B2 | 2/2005 | Srinivasachar et al. |
| 6,864,008 B2 | 3/2005 | Otawa et al. |
| 6,878,358 B2 | 4/2005 | Vosteen et al. |
| 6,916,762 B2 | 7/2005 | Shibuya et al. |
| 6,939,523 B2 | 9/2005 | D'Alesandro |
| 6,942,840 B1 | 9/2005 | Broderick |
| 6,945,925 B2 | 9/2005 | Pooler et al. |
| 6,953,494 B2 | 10/2005 | Nelson, Jr. |
| 6,960,329 B2 | 11/2005 | Sellakumar |
| 6,962,617 B2 | 11/2005 | Simpson |
| 6,969,494 B2 | 11/2005 | Herbst |
| 6,972,120 B2 | 12/2005 | Holste et al. |
| 6,974,562 B2 | 12/2005 | Ciampi et al. |
| 6,974,564 B2 | 12/2005 | Biermann |
| 6,975,975 B2 | 12/2005 | Fasca |
| 7,118,720 B1 | 10/2006 | Mendelsohn et al. |
| 7,141,091 B2 | 11/2006 | Chang |
| 7,151,199 B2 | 12/2006 | Martens et al. |
| 7,153,481 B2 | 12/2006 | Bengtsson et al. |
| 7,156,959 B2 | 1/2007 | Herbst |

(56) References Cited

U.S. PATENT DOCUMENTS

| | | |
|---|---|---|
| 7,250,387 B2 | 7/2007 | Durante et al. |
| 7,312,300 B2 | 12/2007 | Mitchell |
| 7,331,533 B2 | 2/2008 | Bayer et al. |
| 7,332,002 B2 | 2/2008 | Johnson et al. |
| 7,361,209 B1 | 4/2008 | Durham et al. |
| 7,381,380 B2 | 6/2008 | Herbst |
| 7,381,387 B2 | 6/2008 | Lissianski et al. |
| 7,384,615 B2 | 6/2008 | Boardman et al. |
| 7,387,719 B2 | 6/2008 | Carson et al. |
| 7,413,719 B2 | 8/2008 | Digdon |
| 7,416,137 B2 | 8/2008 | Hagen et al. |
| 7,435,286 B2 | 10/2008 | Olson et al. |
| 7,452,392 B2 | 11/2008 | Nick et al. |
| 7,473,303 B1 | 1/2009 | Higgins et al. |
| 7,476,324 B2 | 1/2009 | Ciampi et al. |
| 7,479,215 B2 | 1/2009 | Carson et al. |
| 7,479,263 B2 | 1/2009 | Chang et al. |
| 7,494,632 B1 | 2/2009 | Klunder |
| 7,507,083 B2 | 3/2009 | Comrie |
| 7,514,052 B2 | 4/2009 | Lissianski et al. |
| 7,517,445 B2 | 4/2009 | Carson et al. |
| 7,517,511 B2 | 4/2009 | Schofield |
| 7,524,473 B2 | 4/2009 | Lindau et al. |
| 7,531,708 B2 | 5/2009 | Carson et al. |
| 7,544,339 B2 | 6/2009 | Lissianski et al. |
| 7,779,777 B2 | 8/2010 | Shiobara et al. |
| 7,862,646 B2 * | 1/2011 | Carruthers et al. ............. 95/131 |
| 8,124,036 B1 | 2/2012 | Baldrey et al. |
| 8,221,532 B2 * | 7/2012 | Carruthers et al. ............. 96/148 |
| 8,372,362 B2 | 2/2013 | Durham et al. |
| 8,383,071 B2 | 2/2013 | Dillon et al. |
| 2002/0068030 A1 | 6/2002 | Nolan et al. |
| 2002/0114749 A1 | 8/2002 | Cole |
| 2002/0121482 A1 | 9/2002 | Ciampi et al. |
| 2003/0065236 A1 | 4/2003 | Vosteen et al. |
| 2003/0079411 A1 | 5/2003 | Kansa et al. |
| 2003/0164309 A1 | 9/2003 | Nakamura et al. |
| 2003/0166988 A1 | 9/2003 | Hazen et al. |
| 2003/0206843 A1 | 11/2003 | Nelson, Jr. |
| 2004/0013589 A1 | 1/2004 | Vosteen et al. |
| 2004/0016377 A1 | 1/2004 | Johnson et al. |
| 2004/0129607 A1 | 7/2004 | Slater et al. |
| 2004/0208809 A1 * | 10/2004 | D'Alesandro ........... 423/243.08 |
| 2004/0256247 A1 | 12/2004 | Carson et al. |
| 2005/0020828 A1 | 1/2005 | Therkelsen |
| 2005/0026008 A1 | 2/2005 | Heaton et al. |
| 2005/0039598 A1 | 2/2005 | Srinivasachar et al. |
| 2005/0056548 A1 | 3/2005 | Minter |
| 2005/0090379 A1 | 4/2005 | Shibuya et al. |
| 2005/0132880 A1 | 6/2005 | Chang |
| 2006/0027488 A1 | 2/2006 | Gauthier |
| 2006/0029531 A1 | 2/2006 | Breen et al. |
| 2006/0051270 A1 | 3/2006 | Brunette |
| 2006/0124444 A1 | 6/2006 | Nakamura et al. |
| 2006/0185226 A1 | 8/2006 | McDonald et al. |
| 2006/0204418 A1 | 9/2006 | Chao et al. |
| 2006/0205592 A1 | 9/2006 | Chao et al. |
| 2006/0266391 A1 | 11/2006 | Wang |
| 2007/0051239 A1 | 3/2007 | Holmes et al. |
| 2007/0089762 A1 | 4/2007 | Baumann et al. |
| 2007/0156288 A1 | 7/2007 | Wroblewski et al. |
| 2007/0167309 A1 | 7/2007 | Olson |
| 2007/0179056 A1 | 8/2007 | Baek et al. |
| 2007/0180990 A1 | 8/2007 | Downs et al. |
| 2007/0184394 A1 | 8/2007 | Comrie |
| 2008/0060519 A1 | 3/2008 | Maly et al. |
| 2008/0069749 A1 | 3/2008 | Liu et al. |
| 2008/0107579 A1 | 5/2008 | Downs et al. |
| 2008/0115704 A1 | 5/2008 | Berry et al. |
| 2008/0121142 A1 | 5/2008 | Comrie |
| 2008/0233238 A1 * | 9/2008 | Roney et al. .................... 426/50 |
| 2009/0007785 A1 | 1/2009 | Kimura et al. |
| 2009/0031929 A1 | 2/2009 | Boardman et al. |
| 2009/0047199 A1 | 2/2009 | Arrol et al. |
| 2009/0081092 A1 | 3/2009 | Yang et al. |
| 2009/0104097 A1 | 4/2009 | Dunson, Jr. |
| 2009/0117019 A1 | 5/2009 | Comrie |
| 2009/0136401 A1 | 5/2009 | Yang et al. |
| 2010/0068111 A1 | 3/2010 | Walsh, Jr. |
| 2010/0221166 A1 | 9/2010 | Muggli |
| 2011/0030592 A1 | 2/2011 | Baldrey et al. |
| 2011/0206586 A1 | 8/2011 | Mooney |
| 2013/0034481 A1 | 2/2013 | Dillon et al. |
| 2014/0030178 A1 | 1/2014 | Martin |
| 2014/0202497 A1 | 7/2014 | Kreis et al. |
| 2015/0013603 A1 | 1/2015 | Morioka et al. |

FOREIGN PATENT DOCUMENTS

| | | |
|---|---|---|
| CA | 2150529 | 12/1995 |
| CA | 2418578 | 8/2003 |
| CA | 2435474 | 1/2004 |
| CN | 1052838 | 7/1991 |
| DE | 2548845 | 5/1976 |
| DE | 2917273 | 11/1980 |
| DE | 3615759 | 11/1987 |
| DE | 3628963 | 3/1988 |
| DE | 3711503 | 10/1988 |
| DE | 3918292 | 4/1990 |
| DE | 4218672 | 8/1993 |
| DE | 4308388 | 10/1993 |
| DE | 4422661 | 1/1996 |
| DE | 19520127 | 12/1996 |
| DE | 19850054 | 5/2000 |
| DE | 10233173 | 7/2002 |
| DE | 60019603 | 4/2006 |
| EP | 0009699 | 4/1980 |
| EP | 0115634 | 8/1984 |
| EP | 0208036 | 1/1987 |
| EP | 0220075 | 4/1987 |
| EP | 0254697 | 1/1988 |
| EP | 0433674 | 11/1990 |
| EP | 0433677 | 6/1991 |
| EP | 0435848 | 7/1991 |
| EP | 0628341 | 12/1994 |
| EP | 0666098 | 8/1995 |
| EP | 0709128 | 5/1996 |
| EP | 0794240 | 9/1997 |
| EP | 0908217 | 4/1999 |
| EP | 1213046 | 10/2001 |
| EP | 1199354 | 4/2002 |
| EP | 1271053 | 1/2003 |
| EP | 1386655 | 2/2004 |
| EP | 1570894 | 9/2005 |
| EP | 1671706 | 7/2006 |
| FR | 1394847 | 4/1965 |
| GB | 1121845 | 7/1968 |
| JP | 11-94234 | 6/1905 |
| JP | 59-10343 | 1/1984 |
| JP | 59-76537 | 5/1984 |
| JP | 59-160534 | 9/1984 |
| JP | 63-100918 | 5/1988 |
| JP | 09-239265 | 9/1997 |
| JP | 10-109016 | 4/1998 |
| JP | 2000-197811 | 7/2000 |
| JP | 2000-205525 | 7/2000 |
| JP | 2001-347131 | 12/2001 |
| JP | 2002-355031 | 12/2002 |
| JP | 2003-065522 | 3/2003 |
| JP | 2004-066229 | 3/2004 |
| JP | 2005-230810 | 9/2005 |
| KR | 2004-0010276 | 1/2004 |
| WO | WO 86/04602 | 8/1986 |
| WO | WO 91/09977 | 7/1991 |
| WO | WO 96/30318 | 10/1996 |
| WO | WO 97/17480 | 5/1997 |
| WO | WO 98/15357 | 4/1998 |
| WO | WO 99/58228 | 11/1999 |
| WO | WO 01/28787 | 4/2001 |
| WO | WO 01/38787 | 5/2001 |
| WO | WO 03/093518 | 11/2003 |

(56) References Cited

FOREIGN PATENT DOCUMENTS

| | | |
|---|---|---|
| WO | WO 2005/092477 | 10/2005 |
| ZA | 2003-05568 | 7/2004 |

OTHER PUBLICATIONS

"Bromine" webpage, http://www2.gtz.de/uvp/publika/English/vol318.htm, printed Sep. 14, 2006, 4 pages.
"Burning PRB Coals ADA Environmental Offers Flyash Solutions," Western Coal Advisory, Summer/Autumn 1999, 1 page.
"Chlorine" webpage, http://www2.gtz.de/uvp/publika/English/vol324.htm, printed Sep. 14, 2006, 4 pages.
"Cyclone Furnaces," Chapter 10 of Steam/Its Generation and Use, Babcock & Wilcox, 1972, 38th Edition, pp. 10-1 to 10-8.
"Description of Operation of an Activated Carbon Injection System Utilizing Dense Phase Material Transport," ADA-ES internal documentation, Nov. 10, 2011, 2 pages.
"DOE Announces Further Field Testing of Advanced Mercury Control Technologies, Six Projects Selected in Round 2 to Address Future Power Plant Mercury Reduction Initiatives," TECHNews From the National Energy Technology Laboratory, Nov. 5, 2004, available at http://www.netl.doe.gov/publications/TechNews/tn_mercury-control.html, printed on Jun. 3, 2009, pp. 1-2.
"DrägerSenor Cl2—68 08 865 Data Sheet," Drager Product Information, Apr. 1997, pp. 1-6 (with English translation).
"Enhanced Mercury Control: KNX™ Coal Additive Technology," Alstom Power Inc., printed Aug. 3, 2006, 1 page.
"Evaluation of Sorbent Injection for Mercury Control at Great River Energy Coal Creek Station," ADA Environmental Solutions, Nov. 16-20, 2003 Final Report, Electric Power Research Institute, issued Mar. 3, 2004, 32 pages.
"Fuel Ash Effects on Boiler Design and Operation," Chapter 21 of Steam/Its Generation and Use, Babcock & Wilcox Company, 2005, 41st Edition, pp. 21-1 to 21-27.
"Fuel-ash Effects on Boiler Design and Operation," Chapter 15 of Steam/Its Generation and Use, Babcock and Wilcox Company, 1972, 38th Edition, pp. 15-1 to 15-26.
"Gas Phase Filtration," Vaihtoilma White Air Oy, date unknown, 3 pages.
"Impregnated Activated Carbon," Products and Technologies Website, as early as 1999, available at http://www.calgoncarbon.com/product/impregnated.html, printed on Dec. 18, 1999, p. 1.
"Incineration: Taking the heat out of complex waste," Bayer Industry Services website, as early as 2005, available at http://web.archive.org/web/20060318115553/www.entsorgung.bayer.com/index.cfm?PAGE_ID=299, pp. 1-2, printed on Jun. 4, 2009.
"Iron- and Steelmaking," date unknown, pp. 646-660.
"Protecting Human Health. Mercury Poisoning," US EPA Website, as early as Oct. 8, 1999, available at http://www.epa.gov/region02/health/mercury/, printed on Feb. 5, 2002, pp. 1-4.
"Texas Genco, EPRI, and URS Corporation Test Innovative Mercury Control Method at Limestone Station—Technology Aims to Capture More Mercury from Power Plant Exhaust," News Release, Jan. 11, 2005, available at http://amptest.epri.com/corporate/discover_epri/news/2005/011105_mercury.html, printed on Apr. 24, 2009, pp. 1-2.
Aldrich Chemical Catalog, Aldrich Chemical Co., Inc., 1996, pp. 863-866.
Anders et al., "Selenium in Coal-Fired Steam Plant Emissions," Environmental Science & Technology, 1975, vol. 9, No. 9, pp. 856-858.
Bansal et al., Active Carbon, Marcel Dekker, Inc., New York, 1989, pp. 1-3, 24-29, 391-394, 457.
Benson et al., "Air Toxics Research Needs: Workshop Findings," Proceedings of the 1993 So2 Control Symposium, U.S. EPA, vol. 2, Session 6A, Aug. 24-27, 1993, pp. 1-17, Boston, MA.
Biswas et al., "Control of Toxic Metal Emissions from Combustors Using Sorbents: A Review," J. Air & Waste Manage. Assoc., Feb. 1998, vol. 48, pp. 113-127.

Biswas et al., "Introduction to the Air & Waste Management Association's 29th Annual Critical Review," Journal of the Air & Waste Management Association, Jun. 1999, pp. 1-2.
Bloom, "Mercury Speciation in Flue Gases: Overcoming the Analytical Difficulties," presented at EPRI Conference, Managing Hazardous Air Pollutants, State of the Arts, Washington D.C., Nov. 1991, pp. 148-160.
Brown et al., "Mercury Measurement and Its Control: What We Know, Have Learned, and Need to Further investigate," J. Air & Waste Manage. Assoc, pp. 1-97 (Jun. 1999).
Buschmann et al., "The KNXT™ Coal Additive Technology A Simple Solution for Mercury Emissions Control," Alstom Power Environment, Dec. 2005, pp. 1-7.
Bustard et al., "Full-Scale Evaluation of Sorbent Injection for Mercury Control on Coal-Fired Power Plants" Air Quality III, ADA Environmental Solutions, LLC (Arlington, VA) (Sep. 12, 2002).
Calgon Carbon product and bulletin webpages, 11 pages (undated).
Carey et al., "Factors Affecting Mercury Control in Utility Flue Gas Using Activated Carbon," J. Air & Waste Manage. Assoc., Dec. 1998, vol. 48, pp. 1166-1174.
De Vito et al., "Sampling and Analysis of Mercury in Combustion Flue Gas," Presented at the Second International Conference on Managing Hazardous Air Pollutants, Washington, DC, Jul. 13-15, 1993, pp. VII39-VII-65.
Declaration of Richard Schlager; Sep. 18, 2002.
Donnet et al., eds., Carbon Black: Science and Technology, 2nd Edition, Marcel Dekker, New York, 1993, pp. 182-187, 218-219.
Dunham et al., "Investigation of Sorbent Injection for Mercury Control in Coal-Fired Boilers," Energy & Environmental Research Center, University of North Dakota (Sep. 10, 1998).
Durham et al., "Full-Scale Evaluation of Mercury Control by Injecting Activated Carbon Upstream of ESPS," Air Quality IV Conference, ADA Environmental Solutions (Littleton, Colorado) (Feb. 10, 2003).
Edwards et al., "A Study of Gas-Phase Mercury Speciation Using Detailed Chemical Kinetics," in Journal of the Air and Waste Management Association, vol. 51, Jun. 2001, pp. 869-877.
Fabian et al., "How Bayer incinerates wastes," Hydrocarbon Processing, Apr. 1979, pp. 183-192.
Felsvang et al., "Activated Carbon Injection in Spray Dryer/ESP/FF for Mercury and Toxics Control" (Feb. 10, 1993).
Felsvang, K. et al., "Air Toxics Control by Spray Dryer," Presented at the 1993 SO2 Control Symposium, Boston, MA, Aug. 24-27, 1993, 16 pages.
Felsvang, K. et al., "Control of Air Toxics by Dry FGDSystems," Power-Gen '92 Conference, 5th International Conference & Exhibition for the Power Generating Industries, Orlando, FL, Nov. 17-19, 1992, pp. 189-208.
Galbreath et al., "Mercury Transformations in Coal Combustion Flue Gas," Fuel Processing Technology, 1999, vol. 65-66, pp. 291-292.
Gale et al., "Mercury Speciation as a Function of Flue Gas Chlorine Content and Composition in a 1 MW Semi-Industrial Scale Coal-Fired Facility," In Proceedings of the Mega Symposium and Air & Waste Management Association's Specialty Conference, Washington, DC, May 19-22, 2003, Paper 28, 19 pages.
Gale, "Mercury Adsorption and Oxidation Kinetics in Coal-Fired Flue Gas," Proceedings of the 30th International Technical Conference on Coal Utilization & Fuel System, 2005, pp. 979-990.
Gale, "Mercury Control with Calcium-Based Sorbents and Oxidizing Agents," Final Report of Southern Research Institute, Jul. 2005, 137 pages.
Gale, "Mercury Control with Calcium-Based Sorbents and Oxidizing Agents," Southern Research Institute, Mercury Control Technology R&D Program Review Meeting, Aug. 12-13, 2003, 25 pages.
Geiger et al, "Einfluβ des Schwefels auf Die Doxin—und Furanbuilding bei der Klärschlammverbrennung," VGB Kraftwerkstechnik, 1992, vol. 72, pp. 159-165.
Ghorishi et al., "Effects of Fly Ash Transition Metal Content and Flue Gas HCl/SO2 Ratio on Mercury Speciation in Waste Combustion," in Environmental Engineering Science, Nov. 2005, vol. 22, No. 2, pp. 221-231.

(56) References Cited

OTHER PUBLICATIONS

Ghorishi et al., "In-Flight Capture of Elemental Mercury by a Chlorine-Impregnated Activated Carbon," presented at the Air & Waste Management Association's 94h Annual Meeting & Exhibition, Orlando, FL, Jun. 2001, pp. 1-14.

Granite et al., "Novel Sorbents for Mercury Removal from Flue Gas," National Energy Technology Laboratory (Apr. 10, 2000).

Griffin, "A New Theory of Dioxin Formation in Municipal Solid Waste Combustion," Chemosphere, 1986, vol. 15, Nos. 9-12, pp. 1987-1990.

Gullet, B.K. et al, "The Effect of Sorbent Injection Technologies on Emissions of Coal-Based, Based, Metallic Air Toxics," Proceedings of the 1993 S02 Control Symposium, vol. 2, U.S. EPA (Research Triangle Park, NC) Session 6A, Boston, MA, Aug. 24-27, 1993, 26 pages.

Gullett, B. et al., "Bench-Scale Sorption and Desorption of Mercury with Activated Carbon," Presented at the 1993 International Conference on Municipal Waste Combustion, Williamsburg, VA, Mar. 30-Apr. 2, 1993, pp. 903-917.

Gullett, B. et al., "Removal of Illinois Coal-Based Volatile Tracy Mercury," Final Technical Report, Sep. 1, 1996 through Aug. 31, 1997.

Guminski, "The Br-Hg (Bromine-Mercury) System," Journal of Phase Equilibria, Dec. 2000, vol. 21, No. 6, pp. 539-543.

Hall et al., "Chemical Reactions of Mercury in Combustion Flue Gases," Water, Air, and Soil Pollution 56:3-14,1991.

Hein, K.R.G. et al., Research Report entitled, "Behavior of Mercury Emission from Coal Sewage Sludge Co-combustion Taking into Account the Gaseous Species," Förderkennzeichen: PEF 398002, Apr. 2001 (English Abstract).

Henning et al., "Impregnated activated carbon for environmental protection," Gas Separation & Purification, Butterworth-Heinemann Ltd., vol. 7, No. 4 (Feb. 9, 1993).

Ismo et al., "Formation of Aromatic Chlorinated Compounds Catalyzed by Copper and Iron," Chemosphere vol. 34, No. 12, pp. 2649-2662 (1997).

Jozewicz et al., "Bench-Scale Scale Investigation of Mechanisms of Elemental Mercury Capture by Activated Carbon," Presented at the Second International Conference on Managing Hazardous Air Pollutants, Washington, D.C., Jul. 13-15, 1993, pp. VII-85 through VII-99.

Kellie et al., "The Role of Coal Properties on Chemical and Physical Transformation on Mercury in Post Combustion," presented at Air Quality IV Conference, Arlington, VA, Sep. 2003, pp. 1-14.

Kilgroe et al., "Fundamental Science and Engineering of Mercury Control in Coal-Fired Power Plants," presented at Air Quality IV Conference, Arlington, VA, Sep. 2003.

Kobayashi, "Japan EnviroChemicals, Ltd. Overview," Feb. 3, 2002, 3 pages.

Kramlich, "The Homogeneous Forcing of Mercury Oxidation to Provide Low-Cost Capture," Abstract, University of Washington, Department of Mechanical Engineering, Mar. 25, 2004, available at http://www.netl.doe.gov/publications/proceedings/04/UCR-HBCU/abstracts/Kr- amlich.pdf, pp. 1-2.

Krishnan et al., "Mercury Control by Injection of Activated Carbon and Calcium-Based Based Sorbents," Solid Waste Management: Thermal Treatment and Waste-to-Energy Technologies, U.S. EPA and AWMA, Washington, DC, Apr. 18-21, 1995, pp. 493-504.

Krishnan et al., "Mercury Control in Municipal Waste Combustors and Coal Fired Utilities," Environmental Progress, ProQuest Science Journals, Spring 1997, vol. 16, No. 1, pp. 47-53.

Krishnan et al., "Sorption of Elemental Mercury by Activated Carbons," Environmental Science and Technology, 1994, vol. 28, No. 8, pp. 1506-1512.

Lee et al., "Mercury Control Research: Effects of Fly Ash and Flue Gas Parameters on Mercury Speciation," U.S. Environmental Protection Agency National Risk Management Research Laboratory and ARCADIS, as early as 1998, Geraghy & Miller, Inc., pp. 221-238, Research Triangle Park, NC.

Lemieux et al., "Interactions Between Bromine and Chlorine in a Pilot-Scale Hazardous Waste Incinerator," paper presented at 1996 International Incineration Conference, Savannah, GA, May 6-10, 1996.

Linak et al., "Toxic Metal Emissions from Incineration: Mechanisms and Control" Progress in Energy & Combustion Science, 1993, vol. 19, pp. 145-185.

Lissianski et al., "Effect of Coal Blending on Mercury Removal," presented at the Low Rank Fuels Conference, Billings, MT, Jun. 24-26, 2003, pp. 1-9.

Livengood et al "Enhanced Control of Mercury Emissions Through Modified Speciation," for Presentation at the Air & Waste Management Association's 90th Meeting & Exhibition, Jun. 8-13, 1997, 14 pages.

Livengood et al., "Development of Mercury Control Techniques for Utility Boilers," for Presentation at the 88th Air & Waste Management Association Annual Meeting & Exhibit, Jun. 18-23, 1995, pp. 1-14.

Livengood et al., "Investigation of Modified Speciation for Enhanced Control of Mercury," Argonne National Laboratory, 1998, available at http://www.netl.doe.gov/publications/proceedings/97/97ps/ps__pdf/PS2B-9.pdf, pp. 1-15.

Luijk et al., "The Role of Bromine in the De Novo Synthesis in a Model Fly Ash System," Chemosphere, 1994, vol. 28, No. 7, pp. 1299-1309.

Martel, K., "Brennstoff-und lastspezifische Untersuchungen zum Verhalten von Schwermetallen in Kohlenstaubfeuerungen [Fuel and load specific studies on the behavior of heavy metals in coal firing systems ]," Fortschritt-Berichte VDI, Apr. 2000, pp. 1-240.

McCoy et al., "Full-Scale Mercury Sorbent Injection Testing at DTE Energy's St. Clair Station," Paper #97, DTE Energy, as early as 2004, pp. 1-9.

Mills Jr., "Techline: Meeting Mercury Standards," as early as Jun. 18, 2001, available at http://www.netl.doe.gov/publications/press/2001/tl__mercurye12.html, printed on Feb. 5, 2002, pp. 1-3.

Niessen, Combustion and Incineration Processes, 2002, Marcel Dekker, 3rd Edition, p. 25.

Niksa et al., "Predicting Mercury Speciation in Coal-Derived Flue Gases," presented at the 2003 Combined Power Plant Air Pollutant Control Mega Symposium, Washington, D.C., May 2003, pp. 1-14.

Nucon International, Inc., "Nusorb Mersorb Family of Adsorbents for Mercury Control," As early as Jan. 2002, 3 pages.

Oberacker et al., "Incinerating the Pesticide Ethylene Dibromide (EDB)—A field-Scale Trail Burn Evaluation of Environmental Performance," Report EPA /600/D-88/198, Oct. 1988, pp. 1-11.

Olson et al., "An Improved Model for Flue Gas-Mercury Interactions on Activated Carbons," presented at Mega Symposium May 21, 2003, Energy & Environmental Research Center publication, Paper # 142, pp. 1-8.

Olson et al., "Oxidation Kinetics and the Model for Mercury Capture on Carbon in Flue Gas," presented at Air Quality V Conference, Sep. 21, 2005, pp. 1-7.

Oppenheimer et al., "Thermische Entsorgung von Produktionsabfällen," Entsorgungs-Praxis, 2000, vol. 6, pp. 29-33.

Pavlish et al., "Status Review of Mercury Control Options for Coal-Fired Power Plants," Fuel Processing Technology, Aug. 2003, vol. 82, pp. 89-165.

"RBHG 4 Combats Mercury Pollution," Know-How, Norit, vol. 6(2), 2003, 3 pages.

Revised Declaration of Richard Schlager, Aug. 19, 2003.

Richardson et al., "Chemical Addition for Mercury Control in Flue Gas Derived from Western Coals," presented at the 2003 Combined Power Plant Air Pollutant Control Mega Symposium, Washington D.C., May 2003, Paper # 63, pp. 1-16.

Sage et al., "Relationship of Coal-Ash Viscosity to Chemical Composition," Journal of Engineering for Power, Apr. 1960, pp. 145-155.

Samaras et al., "PCDD/F Prevention by Novel Inhibitors: Addition of Inorganic S- and N-Compounds in the Fuel before Combustion," Environmental Science and Technology, 2000, vol. 34, No. 24, pp. 5092-5096.

Senior et al., "Gas-Phase Transformations of Mercury in Coal-Fired Power Plants," Fuel Processing Technology, vol. 63, 2000, pp. 197-213.

(56) References Cited

OTHER PUBLICATIONS

Senior, "Behavior of Mercury in Air Pollution Control Devices on Coal-Fired Utility Boilers," Power Production in the 21st Century: Impacts of Fuel Quality and Operations, Engineering Foundation Conference, Snowbird, UT (Oct 28-Nov. 2, 2001).
Singer, J., ed., "Development of Marine Boilers," Combustion Fossil Power, Combustion Engineering, Inc., Windsor, CT, 1991, Ch. 3, pp. 10-4-10-14.
Sjostrom et al., "Full-Scale Evaluation of Mercury Control at Great River Energy's Stanton Generating Station Using Injected Sorbents and a Spray Dryer/Baghouse," Air Quality III Conference, Session A3b (Feb. 10, 2002).
Sjostrom et al., "Full-Scale Evaluation of Mercury Control by Injecting Activated Carbon Upstream of a Spray Dryer and Fabric Filter," Presented at the 2004 combined power plant air pollutant control mega symposium, Washington, D.C., Aug. 2004, 18 pages.
Sjostrom, "Evaluation of Sorbent Injection for Mercury Control," ADA-ES, Inc. Topical Report for Basin Electric Power Cooperative's Laramie River Station, Jan. 16, 2006, 49 pages.
Sjostrom, "Evaluation of Sorbent Injection for Mercury Control," Topical Report for Sunflower Electric's Holcomb Station, U.S. DOE Cooperative Agreement No. DE-FC26-03NT41986, Topical Report No. 41986R07, Jun. 2005, 85 pages.
SKC, "The Essential Reference for air sampling," 1997 Comprehensive Catalog & Air Sampling Guide (4 pages).
Sliger et al., "Towards the Development of a Chemical Kinetic Model for the Homogeneous Oxidation of Mercury by Chlorine Species," Fuel Processing Technology, vol. 65-66, 2000, pp. 423-438.
Speight, ed., The Chemistry and Technology of Coal, CRC Press, 1994, pp. 152-155.
Starns et al., "Full-Scale Evaluation of Toxecon II™ on a Lignite-Fired Boiler" presented at US EPA/DOE/EPRI Combiner Power Plant Air Pollutant Control Symposium: The Mega Symposium, Washington, DC (Aug. 30-Sep. 2, 2004).
Steele "Dense-Phase Pneumatic Conveying Systems," Powder/Bulk solids, Jan. 2007, 5 pages.
Sudhoff, "Anticipated Benefits of the TOXECON Retrofit for Mercury and Multi-Pollutant Control Technology," National Energy Technology Laboratory, Nov. 19, 2003, available at http://www.netl.doe.gov/technologies/coalpower/cctc/pubs/Benefits_TOXECON_111903.pdf, pp. 1-20.
Teller et al., "Mercury Removal from Incineration Flue Gas," Air and Water Technologies Co., for presentation at the 84th Annual Meeting & Exhibition Vancouver, British Columbia, Jun. 16-21, 1991.
United States Environmental Protection Agency, "Study of Hazardous Air Pollutant Emissions from Electric Tility Steam Generating Units," Report to Congress, vol. 1-2, EPA-453/R-98-004a&b, Feb. 1998, pp. 1-165.
United States Environmental Protection Agency, EPA-452/R-97-010, "Mercury Study Report to Congress' vol. VIII—An Evaluation of Mercury Control Technologies and Costs," Dec. 1997.
Urabe et al., "Experimental Studies on Hg Vapour Removal Using Corona Discharge for Refuse Incinerator," Chemical Abstracts, Oct. 1997, vol. 109, 37 pages (includes translation).
Urano, S., "Studies on Bleaching Powder, VII. The Decomposition of Calcium Hypochlorite by Heat in the Presence of Calcium Chloride," Journal of the Society of Chemical Industry of Japan, vol. 31, 1928, pp. 46-52 (no translation).
Verhulst et al., "Thermodynamic behaviour of metal chlorides and sulfates under the conditions of incineration furnaces," Environmental Science & Technology, 1996, vol. 30, No. 1, pp. 50-56.
Vidic et al., "Uptake of Elemental Mercury Vapors by Activated Carbons;," Journal of the Air & Waste Management Association, 1996, vol. 46, pp. 241-250.
Vidic et al., "Vapor-phase elemental mercury adsorption by activated carbon impregnated with chloride and cheltinq agents," Carbon, 2001, vol. 39, pp. 3-14.
Vosteen et al., "Bromine Enhanced Mercury Abatement from Combustion Flue Gases—Recent Industrial Applications and Laboratory Research," VGB PowerTech, International Journal for Electricity and Heat Generation, 2006, vol. 86, No. 3, pp. 70-75.
Vosteen, et al, "Mercury-Related Chemistry in Waste Incineration and Power Generation Flue Gases," Sep. 2003, Air Quality IV, pp. 1-8.
Wanke et al., "The influence of flame retarded plastic foams upon the formation of Br containing dibenzo-p-dioxins and dibenzofurans in a MSWI," Organohalogen Compounds, 1996, vol. 28, pp. 530-535.
"Speciality Impregnated Carbons," Waterlink/Barnebey Sutcliff, copyright 2000, 5 pages.
Weber et al., "The Role of Copper(II) Chloride in the Formation of Organic Chlorine in Fly Ash," Chemosphere, 2001, vol. 42, pp. 479-582.
White et al., "Field Test of Carbon Injection for Mercury Control at Camden County Municipal Waste Combustor," EPA-600/R-93-181 (NTIS PB94-101540), Sep. 1993, pp. 1-11.
Working project report for period Oct. 1, 1999 to Sep. 30, 2001 from Institut fur Verhrenstechnik and Dampfkesselwessen (IVD), Universitat Stuttgart, dated Mar. 28, 2002, pp. 14-38.
Zygarlicke et al., "Flue gas interactions of mercury, chlorine, and ash during coal combustion," Proceedings of the 23rd International Technical Conference on Coal Utilization and Fuel Systems, Clearwater, Florida, Mar. 9-13, 1998, pp. 517-526 (ISBN 0-03206602302).
"Handling Hydrated Lime from a Lime Supplier's Perspective," Workshop 25, 2010 APC Round Table & Expo Presentation, Reinhold Enviromental Ltd., Jul. 18-20, 2010, 33 pages.
"File: Static Mixer Flow Division.png," Wikipedia, Mar. 24, 2009, Attribution: Ambanmba at en.wikipedia, available at www.en.wikipedia.org/wiki/File:Static_Mixer_Flow_Division.png, 3 pages.
"Static Mixer," Wikipedia, 2013, available at www.en.wikipedia.org/wiki/Static_mixer, 3 pages.
"Static Mixer (Engineering Design Guideline)," KLM Technology Group, 2012, available at www.klmtechgroup.com, 24 pages.
Hirschberg, "Static mixers for flue gas treatment applications," Sulzer Chemtech, 2011, 11 pages.
Official Action for U.S. Appl. No. 14/294,506, mailed Feb. 25, 2015 9 pages.

* cited by examiner

SYSTEM AND METHOD FOR DENSE PHASE SORBENT INJECTION

CROSS REFERENCE TO RELATED APPLICATION

The present application claims the benefits of U.S. Provisional Application Ser. No. 61/559,557, filed Nov. 14, 2011, entitled "DENSE PHASE SYSTEM FOR DISTRIBUTION AND INJECTION OF SORBENTS FOR EMISSIONS CONTROL AT COAL-FIRED POWER PLANTS", which is incorporated herein by this reference in its entirety.

FIELD

The disclosure relates generally to sorbent injection methods and systems and particularly to dense phase sorbent injection methods and systems.

BACKGROUND

Gas emissions from coal-burning utilities and waste incinerators are the subject of increasing levels of contaminant regulation. Pneumatic conveying of sorbent material is a common method of introducing sorbent into contaminated gas streams. It operates by creating a pressure differential along a pipeline and using the air that moves toward the area of lower pressure to move bulk sorbent material. The process can be performed with a vacuum inducer or by injecting compressed air into one end of or along a pipeline.

The two main categories of pneumatic conveying technologies are low-pressure (dilute-phase) and high-pressure (dense-phase) systems. The former category uses either positive or negative pressure to push or pull sorbent material through the convey line at relatively high velocities at or above the material saltation velocity (e.g., typically above about 15 m/s). It is a high-velocity system that employs a high air-to-material ratio. The second category uses positive pressure to push materials through the convey line at relatively low velocities below the material saltation velocity (e.g., typically no more than about 15 m/s). It is a high-pressure, low-velocity system because it has a low air-to-material ratio.

Dry sorbent injection is increasingly being applied to coal-fired power plant flue gas to comply with new air pollution requirements for toxic air pollutants, including mercury, sulfur trioxide, nitrogen oxides, acid gases (such as HCl), and selenium, and to provide supplemental control for criteria pollutants, such as sulfur dioxide. Systems for injecting powdered or finely milled sorbents for emissions control at coal fired power plants are typically delivered in high sorbent particle velocity and low pressure (typically less than 1 bar g) Dilute Phase pneumatic conveying systems with sorbents entrained in a gas stream at speeds above the sorbent saltation velocity. Dense phase conveying has not previously been applied to sorbent injection systems for coal-fired power plants, but could have important advantages over low pressure injection systems. Sorbents used for emission control at coal-fired power plants may include, for example, powdered activated carbon (PAC) for mercury control, dry sorbent injection (DSI) including powdered trona, lime and sodium bicarbonate for acid gas control and other finely divided materials that are injected into the flue gas to adsorb or absorb or otherwise react with specific pollutants.

SUMMARY

These and other needs are addressed by the various aspects, embodiments, and configurations of the present disclosure.

The present disclosure is directed to dense-phase transport of additive for injection into a contaminated gas stream.

A method, according to this disclosure, can include the following steps:

(a) transporting, by dense-phase pneumatic conveyance, an additive from a transport storage vessel to one or more injectors positioned in a contaminated gas stream; and (b) injecting the additive into the contaminated gas stream to cause removal of a contaminant.

The contaminated gas stream commonly is derived from combustion of a high alkali, high iron, and/or high sulfur coal.

The contaminant is typically one or more of a sulfur oxide, a nitrogen oxide, hydrogen sulfide, hydrochloric acid, hydrofluoric acid, mercury, a halogen, a particulate, and a carbon oxide, and the additive can be a sorbent that is one or more of an alkaline material, powdered activated carbon, trona, a halogen, a halide, and a metal oxide.

The method can include the further steps:

(c) conveying, by dilute-phase pneumatic conveyance, additive from a storage vessel and/or hopper to an injection transport vessel; and (d) transporting the additive from the injection transport vessel to the transport storage vessel.

The superficial operating gas flow velocity during dilute-phase pneumatic conveyance is at least the saltation velocity and, during dense-phase pneumatic conveyance, is less than the saltation velocity.

A system, according to this disclosure, can include:

(a) a transport storage vessel to store an additive;

(b) one or more injectors configured to introduce the additive into a contaminated gas stream to cause removal of a contaminant; and (c) a conduit in fluid communication with the transport storage vessel and the one or more injectors and configured to transport, by dense-phase pneumatic conveyance, the additive from the transport storage vessel to the one or more injectors for additive introduction into the contaminated gas stream.

The system can further include:

one or more storage vessels for longer term storage of the additive;

(d) a first feeder for transporting the additive from the one or more storage vessels into a hopper; and (e) a second feeder for transporting the additive from the hopper to a conduit for dilute-phase pneumatic conveyance of the additive to an injection storage hopper.

The system can further include:

(f) an isolation valve to enable and disable supply of additive to the injection storage hopper;

(g) a first discharge valve to enable and disable supply of additive, via the conduit, to the transport storage vessel;

(h) a bypass line to direct additive around the discharge valve and to the injection transport vessel; and (i) a second discharge valve to enable and disable supply of additive, via the bypass line, to the injection transport vessel.

The system can further include:

(j) an inlet valve, in fluid communication with the injection storage vessel, to enable and disable supply of additive to the transport storage vessel;

(k) a vent line to depressurize the transport storage vessel;

(l) a depressurization valve in fluid communication with the vent line to enable and disable depressurization of the transport storage vessel;

(m) a pressurization line to pressurize the transport storage vessel;

(n) a pressurization valve in fluid communication with the vent line to enable and disable pressurization of the transport storage vessel; and (o) an outlet valve to enable and disable supply to the one or more injectors.

A method and tangible, non-transient, computer readable medium, in accordance with this disclosure, can perform the following steps/operations:

(a) determining, by a controller, that an additive amount in a vessel has dropped below a determined level in response to introduction of additive into a contaminated gas stream;

(b) closing, by the controller, an outlet valve to terminate supply of sorbent to one or more injectors positioned in the contaminated gas stream;

(c) opening, by the controller, an inlet valve to cause additive to be introduced into the vessel; and (d) when the additive amount is at least the determined level, closing, by the controller, the inlet valve and opening, by the controller, the outlet valve to supply sorbent to the one or more injectors.

The method/medium can further perform the following steps/operations:

(e) in response to the determining step, closing, by the controller, a pressurization valve and opening a depressurization valve to reduce an operating pressure of the vessel; and (f) when the additive amount is at least the determined level, closing, by the controller, the depressurization valve and opening the pressurization valve to pressurize the vessel.

When there are multiple vessels, each with separate outlet and inlet valves, the controller can determine, at a first time, that an additive amount in a first vessel has dropped below a determined level in response to introduction of additive into the contaminated gas stream and at a later second time that an additive amount in a second vessel has dropped below a determined level in response to introduction of additive into the contaminated gas stream and, in response, perform the above steps/operations at different times with respect to the first and second vessels.

The determination can be made by receiving a signal from a level switch and/or sensor, by passage of time, and/or by an operating pressure of the vessel falling below a selected pressure set point.

The present disclosure can provide a number of advantages depending on the particular configuration. The use of a dense-phase pneumatic conveying system can offers substantial benefits over dilute-phase pneumatic conveying systems. Compared to dilute-phase systems, dense-phase systems can use lower sorbent velocities leading to lower levels of abrasion, sorbent degradation, and added heat, a higher solids-to-air ratio efficiency, and fewer economic limitations on distance, feed rate, and number of feeding locations. Dense-phase pneumatic conveying generally uses higher gas pressures to push the sorbent through a conduit with high solid-air ratios and velocities below the sorbent saltation velocity as measured at the material feed inlet. Limitations on conveying distance and conveying rate are thereby greatly reduced with capabilities to convey thousands of feet and hundreds of thousands of pounds per hour. There is a need for pneumatic conveying systems where sorbent conveying distances and feed rates exceed the known capabilities of conventional dilute phase sorbent injection systems.

These and other advantages will be apparent from the disclosure of the aspects, embodiments, and configurations contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Absorption" is the incorporation of a substance in one state into another of a different state (e.g. liquids being absorbed by a solid or gases being absorbed by a liquid). Absorption is a physical or chemical phenomenon or a process in which atoms, molecules, or ions enter some bulk phase—gas, liquid or solid material. This is a different process from adsorption, since molecules undergoing absorption are taken up by the volume, not by the surface (as in the case for adsorption).

"Adsorption" is the adhesion of atoms, ions, biomolecules, or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. Similar to surface tension, adsorption is generally a consequence of surface energy. The exact nature of the bonding depends on the details of the species involved, but the adsorption process is generally classified as physisorption (characteristic of weak van der Waals forces) or chemisorption (characteristic of covalent bonding). It may also occur due to electrostatic attraction.

"Ash" refers to the residue remaining after complete combustion of the coal particles. Ash typically includes mineral matter (silica, alumina, iron oxide, etc.).

"Biomass" refers to biological matter from living or recently living organisms. Examples of biomass include, without limitation, wood, waste, (hydrogen) gas, seaweed, algae, and alcohol fuels. Biomass can be plant matter grown to generate electricity or heat. Biomass also includes, without limitation, plant or animal matter used for production of fibers or chemicals. Biomass further includes, without limitation, biodegradable wastes that can be burnt as fuel but generally excludes organic materials, such as fossil fuels, which have been transformed by geologic processes into substances such as coal or petroleum. Industrial biomass can be grown from numerous types of plants, including miscanthus, switchgrass, hemp, corn, poplar, willow, sorghum, sugarcane, and a variety of tree species, ranging from eucalyptus to oil palm (or palm oil).

"Coal" refers to a combustible material formed from prehistoric plant life. Coal includes, without limitation, peat, lignite, sub-bituminous coal, bituminous coal, steam coal, waste coal, anthracite, and graphite. Chemically, coal is a macromolecular network comprised of groups of polynuclear aromatic rings, to which are attached subordinate rings connected by oxygen, sulfur, and aliphatic bridges.

A "compressor" is a mechanical device that compresses a gas (e.g., air or natural gas).

A "computer-readable medium" refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

"High alkali coals" refer to coals having a total alkali (e.g., calcium) content of at least about 20 wt. % (dry basis of the ash), typically expressed as CaO, while "low alkali coals" refer to coals having a total alkali content of less than 20 wt. % and more typically less than about 15 wt. % alkali (dry basis of the ash), typically expressed as CaO.

"High iron coals" refer to coals having a total iron content of at least about 10 wt. % (dry basis of the ash), typically expressed as $Fe_2O_3$, while "low iron coals" refer to coals having a total iron content of less than about 10 wt. % (dry basis of the ash), typically expressed as $Fe_2O_3$. As will be appreciated, iron and sulfur are typically present in coal in the form of ferrous or ferric carbonates and/or sulfides, such as iron pyrite.

"High sulfur coals" refer to coals having a total sulfur content of at least about 3 wt. % (dry basis of the coal) while "medium sulfur coals" refer to coals having between about 1.5 and 3 wt. % (dry basis of the coal) and "low sulfur coals" refer to coals having a total sulfur content of less than about 1.5 wt. % (dry basis of the coal).

"Lime" refers to a caustic alkaline earth metal substance, such as calcium hydroxide ($Ca(OH)_2$), calcium oxide, and mixtures thereof produced by heating limestone.

"Means" shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

"Particulate" refers to fine particles, such as fly ash, unburned carbon, soot and fine process solids, typically entrained in a mercury-containing gas stream.

"Saltation velocity" refers to superficial operating gas velocity and is dependent on the physical characteristics of the solids being conveyed, the desired particle mass flow rate, the physical characteristics of the additive induction system, and the thermo-chemical environment of the conveying fluid.

"Particle slip velocity" refers to the difference in the particle velocity and the superficial operating gas velocity and is dependent on the physical characteristics of the solids being conveyed.

"Separating" and cognates thereof refer to setting apart, keeping apart, sorting, removing from a mixture or combination, or isolating. In the context of gas mixtures, separating can be done by many techniques, including electrostatic precipitators, baghouses, scrubbers, and heat exchange surfaces.

A "sorbent" is a material that sorbs another substance; that is, the material has the capacity or tendency to take it up by sorption.

"Sorb" and cognates thereof mean to take up a liquid or a gas by sorption.

"Sorption" and cognates thereof refer to adsorption and absorption, while desorption is the reverse of adsorption.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Overview

The current disclosure is directed to an additive introduction system to introduce additives to control contaminant emissions from contaminant evolving facilities, such as smelters, autoclaves, roasters, steel foundries, steel mills, cement kilns, power plants, waste incinerators, boilers, and other contaminated gas stream producing industrial facilities. Although any contaminant may be targeted by the additive introduction system, typical contaminants include acid gases (e.g., sulfur-containing compounds (such as sulfur dioxide and trioxide produced by thermal oxidation of sulfides), nitrogen oxides (such as nitrogen monoxide and dioxide), hydrogen sulfide ($H_2S$), hydrochloric acid (HCl), and hydrofluoric acid (HF)), mercury (elemental and/or speciated), carbon oxides (such as carbon monoxide and dioxide), halogens and halides, particulates (e.g., fly ash particles and other types of unburned carbon), and the like. Although the contaminant is typically evolved by combustion, it may be evolved by other oxidizing reactions, reducing reactions, and other thermal processes such as roasting, pyrolysis, and autoclaving, that expose contaminated materials to elevated temperatures.

Figure 1:
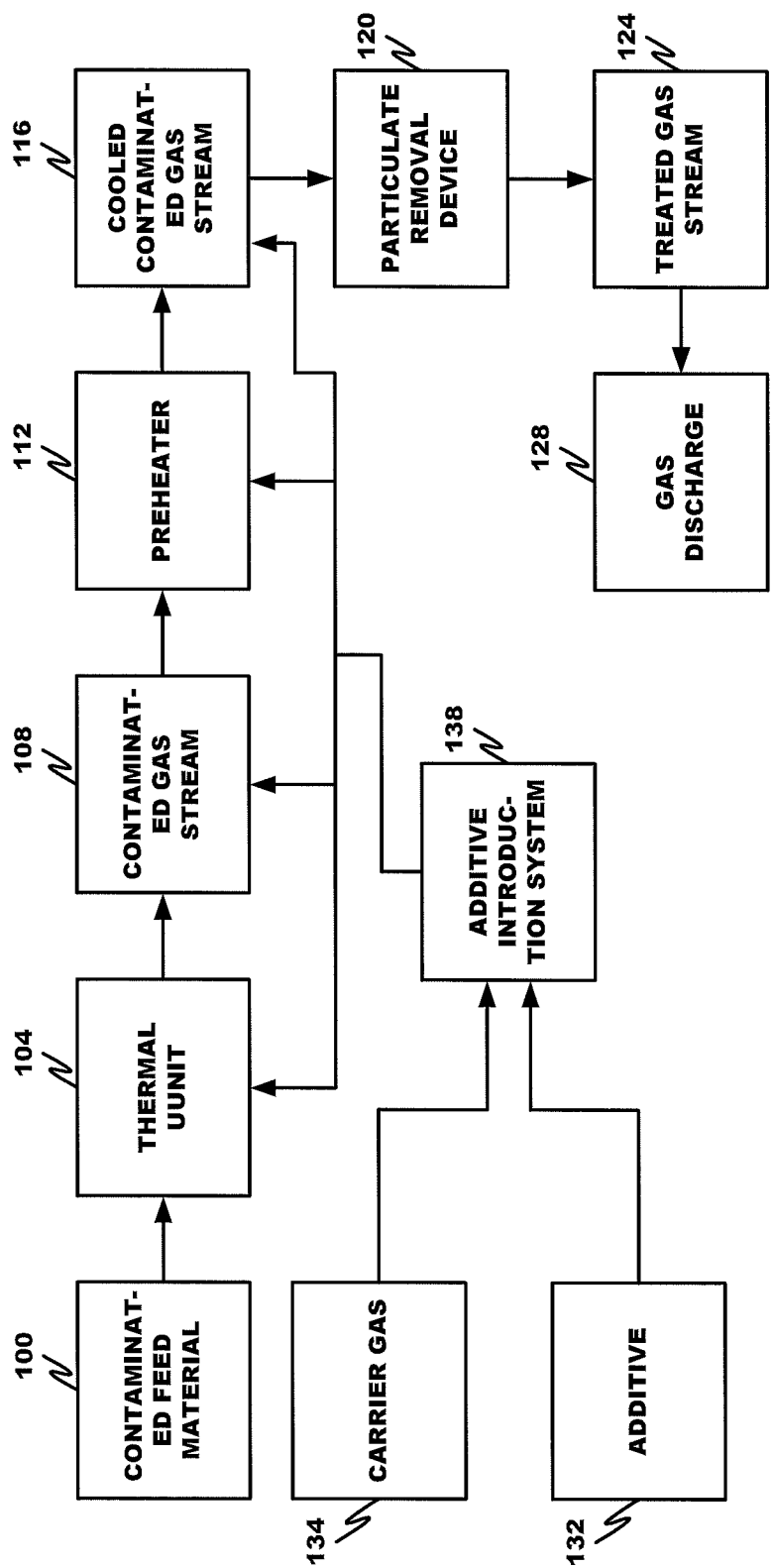
FIG. 1 is a block diagram of an exemplary additive introduction system.

FIG. 1 depicts a contaminated gas stream treatment process for an industrial facility according to an embodiment. Referring to FIG. 1, a contaminated feed material 100 is provided. In one application, the feed material 100 is combustible and can be any synthetic or natural, contaminate-containing, combustible, and carbon-containing material, including coal, petroleum coke, and biomass. The feed material 100 can be a high alkali, high iron, and/or high sulfur coal. In other applications, the present disclosure is applicable to noncombustible, contaminant-containing feed materials, including, without limitation, metal-containing ores, concentrates, and tailings.

The feed material 100 is heated in thermal unit 104 to produce a contaminated gas stream 108. The thermal unit 104 can be any heating device, including, without limitation, a dry or wet bottom furnace (e.g., a blast furnace, puddling furnace, reverberatory furnace, Bessemer converter, open hearth furnace, basic oxygen furnace, cyclone furnace, stoker boiler, cupola furnace, a fluidized bed furnace, arch furnace, and other types of furnaces), boiler, incinerator (e.g., moving grate, fixed grate, rotary-kiln, or fluidized or fixed bed, incinerators), calciners including multi-hearth, suspension or fluidized bed roasters, intermittent or continuous kiln (e.g., ceramic kiln, intermittent or continuous wood-drying kiln, anagama kiln, bottle kiln, rotary kiln, catenary arch kiln, Feller kiln, noborigama kiln, or top hat kiln), or oven, or other heat.

The contaminated gas stream 108 generally includes a number of contaminants. A common contaminated gas stream 108 includes mercury, particulates (such as fly ash), sulfur oxides, nitrogen oxides, hydrochloric acid (HCl), carbon oxides, and unburned carbon.

The contaminated gas stream 108 is optionally passed through the preheater 112 to transfer some of the thermal energy of the contaminated gas stream 108 to air input to the thermal unit 104. The heat transfer produces a common temperature drop in the contaminated gas stream 108 of from about 500° C. to about 300° C. to produce a cooled contaminated gas stream 116 temperature commonly ranging from about 100 to about 400° C.

The cooled contaminated gas stream 116 is next subjected to particulate removal device 120 to remove most of the particulates from the contaminated gas stream and form a treated gas stream 124. The particulate removal device 120 can be any suitable device, including a wet or dry electrostatic precipitator, particulate filter such as a baghouse, wet particulate scrubber, and other types of particulate removal device.

The treated gas stream 124 is emitted, via gas discharge 128, into the environment.

To control contaminant emissions in the treated gas stream 124, an additive 132 entrained in a carrier gas 134 is introduced into the thermal unit 104, contaminated gas stream 108, or cooled contaminated gas stream 116 by an (dry (e.g., at 1,000 hPa and 18 degrees Celsius typically containing no more than about 6 g/kg, more typically no more than about 5 g/kg, more typically no more than about 4 g/kg, more typically no more than about 3 g/kg, more typically no more than about 2 g/kg, more typically no more than about 1 g/kg, and even more typically from about 0.001 g/kg to about 1 g/kg water or water vapor)) additive introduction system 138. The additive is typically a free-flowing, finely-divided sorbent material or blend of different sorbent materials. To entrain the additive particles effectively, the additive particles typically have a mean, median, and $P_{90}$ size of no more than about 100 microns and even more typically ranging from about 2 to about 50 microns. The additive-containing fluid typically includes from about 0.10 to about 6.0 lbm material to lbm air (at standard temperature and pressure).

The additive employed depends on the contaminant targeted. By way of example, an alkaline material, such as lime, a carbonate, or a bicarbonate, can be used to control emissions of sulfur oxides (SOx), hydrochloric acid (HCl), and hydrofluoric acid (HF). Powdered activated carbon ("PAC") can be used to control a variety of contaminants, such as gaseous heavy metals dioxins, furans, mercury, and hydrocarbons. Sodium sesquicarbonate (trona) or sodium bicarbonate can be used to control emissions of sulfur oxides (SOx), hydrogen sulfide ($H_2S$), hydrochloric acid (HCl), and hydrofluoric acid (HF). Halogens and halides can be used to facilitate control mercury emissions. Metal oxides, such as magnesium oxide or magnesium hydroxide, can be used to control acid gas emissions. Sodium carbonate ("soda ash") or (hydrated) lime can be used to control particulate and acid gas emissions.

Although the carrier gas for the additive can be any substantially inert gas (relative to the additive), a common carrier gas is air. Typically, the carrier gas includes a minor amount, more typically no more than about 400 ppm$_v$ vol. %, and even more typically no more than about 390 ppm$_v$ of an additive reactive component, such as carbon dioxide, that reacts with the additive. For example, carbon dioxide reacts with lime to produce calcium carbonate.

The Additive Introduction System

The additive introduction system 138 commonly includes a number of subassemblies. The system 138 includes a storage system 200 (FIG. 2) for long-term sorbent storage and (typically dilute-phase) delivery, an injection storage system 300 (FIG. 3) for shorter-term sorbent storage and delivery, and an injection system 400 for (dense-phase) introduction of the sorbent into the contaminated gas stream 108 or cooled contaminated gas stream 116 (FIG. 4). It can further include one or more compressors (not shown) to pressurize the system and provide compressed air for additive conveyance by a dilute- or dense-phase mechanism.

Figure 2:
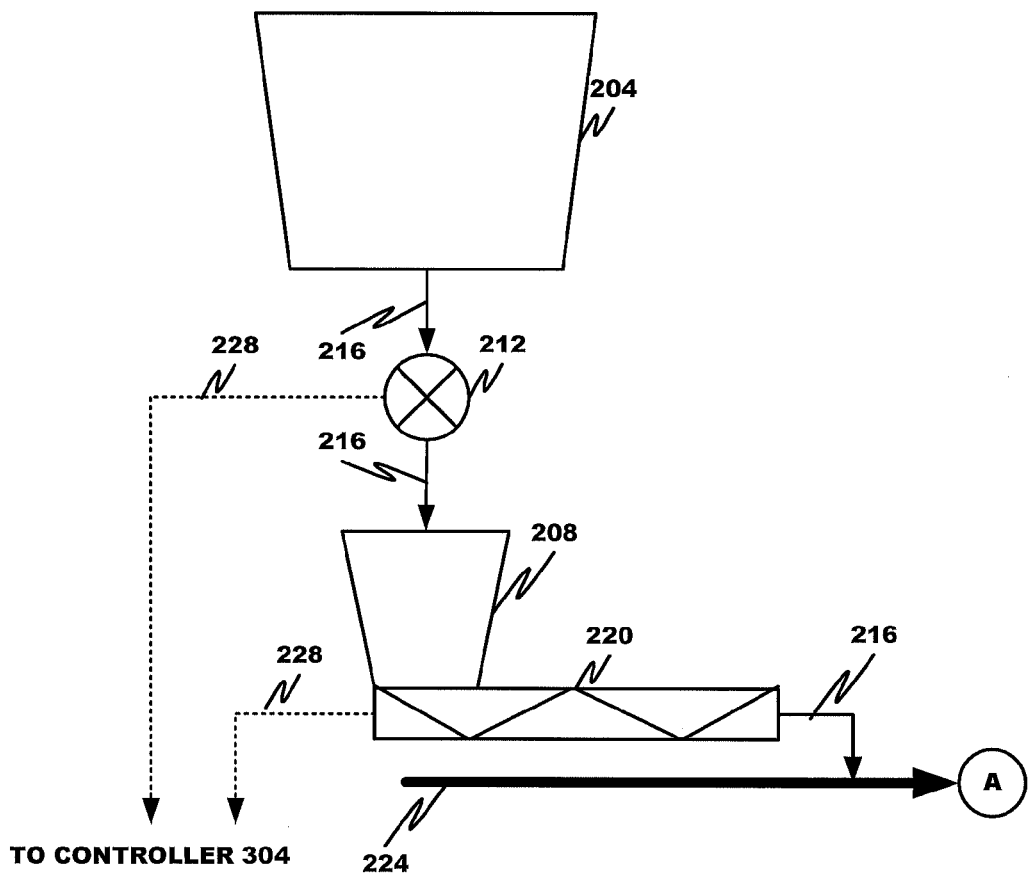
FIG. 2 is a block diagram of an exemplary storage system.

With reference to FIG. 2, the storage system 200 includes one or more storage vessels 204 (e.g., a large bulk storage silo(s) capable of holding multiple days of sorbent storage) for sorbent storage, one or more smaller hoppers 208 for shorter-term sorbent storage, a rotary feeder 212 (or other type of feeder) for transporting the sorbent 216 from a respective one of the storage vessel(s) 204 into the corresponding smaller hopper(s) 208 (for storage and feeding of a screw feeder 220), and the screw feeder (or other type of feeder) 220 for metered feeding of the sorbent 216 from the smaller hopper(s) 208 to a conduit 224 in fluid communication with a motive air source (not shown) for, typically dilute-phase pneumatic (though dense-phase conveying may be employed depending on the application), conveying to the injection storage system 300.

The sorbent material is then conveyed into the injection storage hoppers. The selection of the storage hopper is effected by a controller 304 (FIG. 3) through a series of automatically actuated distribution valves. The controller 304 can further select and control (by control lines 228) the feed rates of the rotary and screw feeders 212 and 220 to realize a selected rate of sorbent addition to the contaminated gas stream 108 or cooled contaminated gas stream 116.

Figure 3:
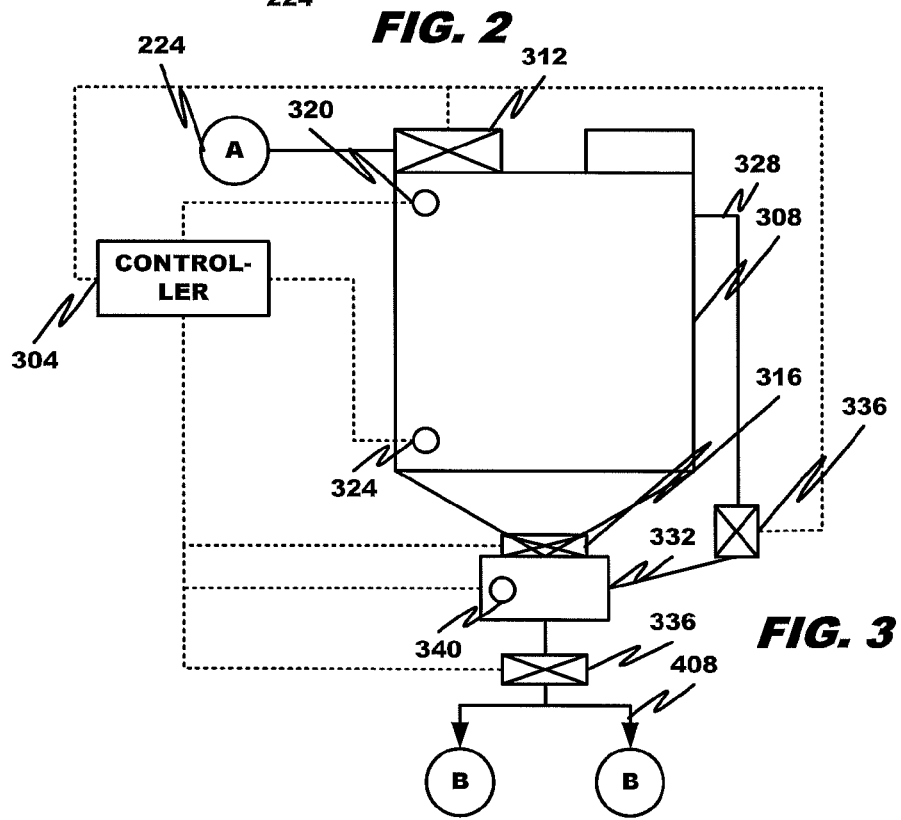
FIG. 3 is a block diagram of an exemplary injection storage system.
Figure 4:
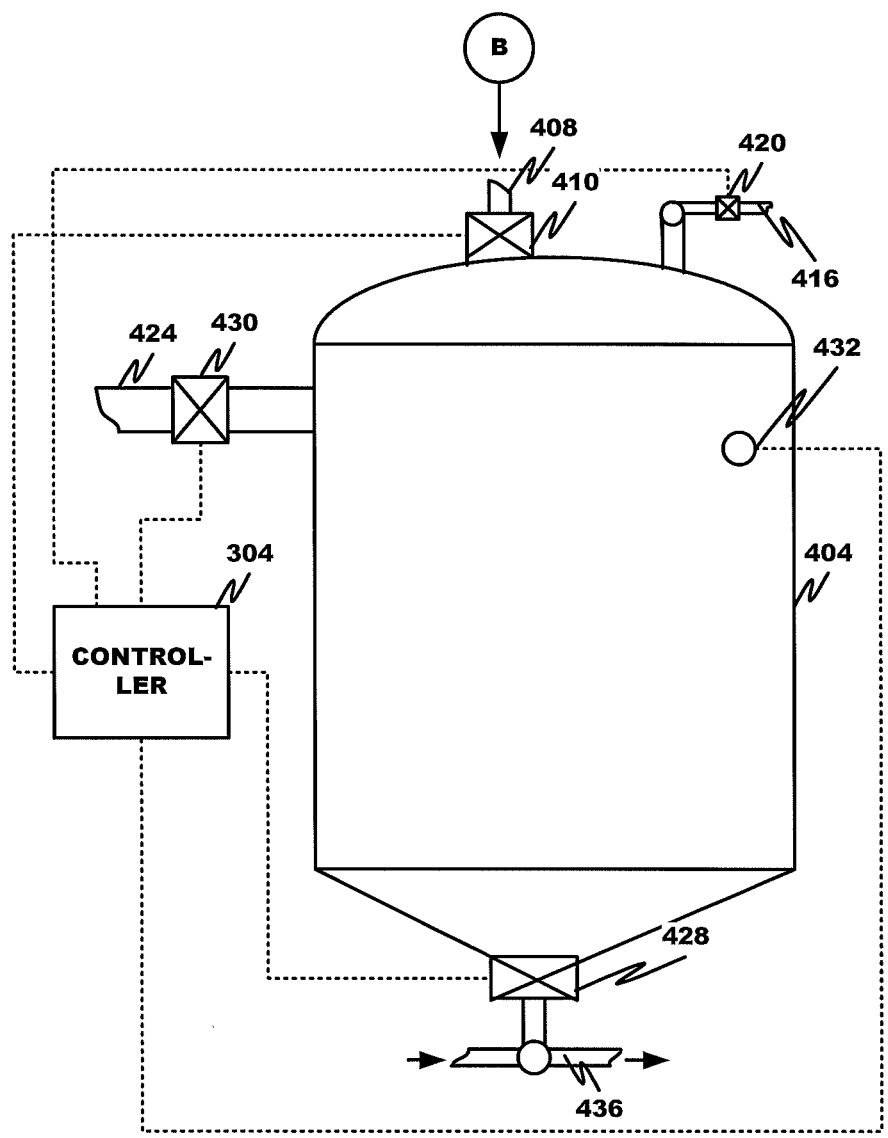
FIG. 4 is a block diagram of an exemplary injection system.

With reference to FIG. 3, the injection storage system 300 is depicted. The system 300 includes one or more injection hopper(s) 308, one or more isolation valve(s) 312 in operative engagement with the conduit 224, one or more hopper discharge valve(s) 316, one or more sets of high and low switch/sensors 320 and 324, respectively, to sense high and low sorbent levels in the injection hopper 308, one or more bypass line(s) 328 to direct sorbent above a selected fill level (at or near the high switch/sensor 320) around first discharge valve 316 to an injection transport vessel 332, one or more bypass valve(s) 336 to open and close the bypass line 328, one or more injection transport vessel(s) 332, one or more injection transport discharge valve(s) 340, one or more switch/sensor(s) 340 in the injection transport vessel 332 to detect a sorbent level in the injection transport vessel 332 to activate opening and closing of the discharge and bypass valves 316 and 336, and one or more controller(s) 304 to receive feedback from the various switch/sensors, select operating parameters and settings, and synchronously control the various valves.

With reference to FIG. 4, the injection system 400 is depicted. The system 400 includes one or more transport storage vessel(s) 404, one or more input conduit(s) 408 conveying sorbent from the injection storage system 300, one or more inlet valve(s) 410 in operative engagement with the input conduit 408, one or more vent line(s) 416, one or more depressurization valve(s) 420 in operative engagement with the vent line 416, one or more pressurization line(s) 424 in fluid communication with a carrier gas (e.g., air), one or more pressurization valve(s) 430 in operative engagement with the pressurization line 424, one or more outlet valves 428, one or more switch/sensors 432, respectively, to sense high and low sorbent levels in the transport storage vessel(s) 404, and a transport conduit 436 to convey fluidized sorbent, by dense-phase pneumatic conveyance, to one or more injectors for introduction into the contaminated gas stream 108 or cooled contaminated gas stream 116. As noted, the controller(s) 304 receives feedback from the various switch/sensors, selects operating parameters and settings, and synchronously controls the various valves.

Operation of the Additive Introduction System

In one application, the sorbent is delivered, typically via rail or truck, and loaded, typically pneumatically, into the storage system 200. The storage system 200 feeds, typically by dilute-phase pneumatic transport, dual (redundant) injection storage systems 300 for dense-phase sorbent transport to the injection system 400 located close to the desired sorbent injection location. From the injection system 400, material is conveyed, typically using a fluidized feed vessel, and fed in batches directly into the injection lance(s) in the contaminated gas stream 108 or cooled contaminated gas stream 116. As will be appreciated, sorbent can be injected in one or more injection locations depending on the application.

The sorbent filling operations of the additive introduction system will be described initially with reference to FIGS. 2-3 and 5.

In step 500, the sorbent is transported, by the rotary feeder 212, from the storage vessel 204 to the feed hoppers 208. The screw feeder 220 carries the sorbent from the feed hoppers 208 to the dilute-phase conduit 224.

In step 504, the sorbent is pneumatically conveyed, by dilute-phase transport, from the storage system 200 to the injection storage hopper(s) 308. The superficial operating gas flow velocity in the conduit 224 is typically at least the saltation velocity plus qualification for the particle slip velocity, more typically ranges from about 54% to about 154% of the saltation velocity plus qualification for the particle slip velocity, and even more typically ranges from about 115% to about 125% of the saltation velocity plus qualification for the particle slip velocity. By way of example, the target superficial gas flow velocity, for a desired particle mass flow rate of 2000 lb/hr for a 32 micrometer (um) particle being conveyed in a 3-inch ID pipe and a conveying fluid temperature of 90° F., ranges from about 828 fpm to about 2773 fpm, and more typically ranges from about 1980 fpm to about 2250 fpm. It is to be appreciated that the flow velocities, while appropriate for some sorbents, such as powdered activated carbon, may not be appropriate for other sorbents, such as trona, lime, or sodium bicarbonate.

The isolation valve 312 and bypass valve(s) 336 are normally closed when the hopper discharge valve(s) 316 is/are open (in which state sorbent is being provided to a respective system 400 in a filling operation), and the isolation valve 312 and bypass valve(s) 336 are normally open when the hopper discharge valve(s) 316 is/are closed (in which state the respective system 300 itself is being filled with sorbent).

When the high (level) switch/sensor 320 is uncovered by sorbent removal from the injection storage hopper(s) 308, the controller 304 enqueues, in step 508, the respective injection storage system 300 in a determined order for initiation of the filling sequence. One exemplary order is based on first-in-first-out in which the various injection storage systems 300 requiring filling are ordered based on the time of receipt of a request to initiate the filling sequence, with the latest time-stamped request going next and the earliest time-stamped request going last. Other sequences will be known to those of ordinary skill in the art.

This ordering may be ignored when the low (level) switch/sensor 324 is uncovered, which indicates that there is insufficient sorbent present in the injection storage system to maintain at least a minimum required sorbent level. In that event, the injection storage system 300 may be elevated to a higher queue position for more rapid refill.

When, in step 512, the selected injection storage hopper is at the head of the queue, the controller 304 instantiates a filling operation. The controller 304 opens the injection storage hopper isolation valve and the bypass valve(s) 332 (to enable sorbent during filling to flow, by the bypass line(s) 328, into the injection transport vessel 332) and closes the discharge valve(s) 316. Uncovering of the high switch/sensor indicates that the selected injection storage hopper has capacity to receive one batch from the dilute phase conveying system. When the high switch/sensor is covered, the controller 304 terminates the filling sequence and commands the isolation valve 312 and bypass valve 336 to close (thereby blocking sorbent from entering the injection storage hopper) and the discharge valve 316 to open to enable sorbent transfer to the injection transport vessel 332.

When the switch/sensor 332 in the injection transport vessel 332 is uncovered by sorbent removal, the controller 304, in step 508, closes the injection transport discharge valve(s) 340 and opens the discharge valve(s) 316 (if not already in the opened state). When the switch/sensor 332 is covered, the controller 304 again opens the transport discharge valve(s) 340 and closes the discharge valve(s) 316.

The injection storage hopper and/or injection transport vessel high and/or low switch/sensor(s) is/are optional. The hopper and/or vessel can be filled off a predetermined fill time in place of the switch/sensor.

Figure 5:
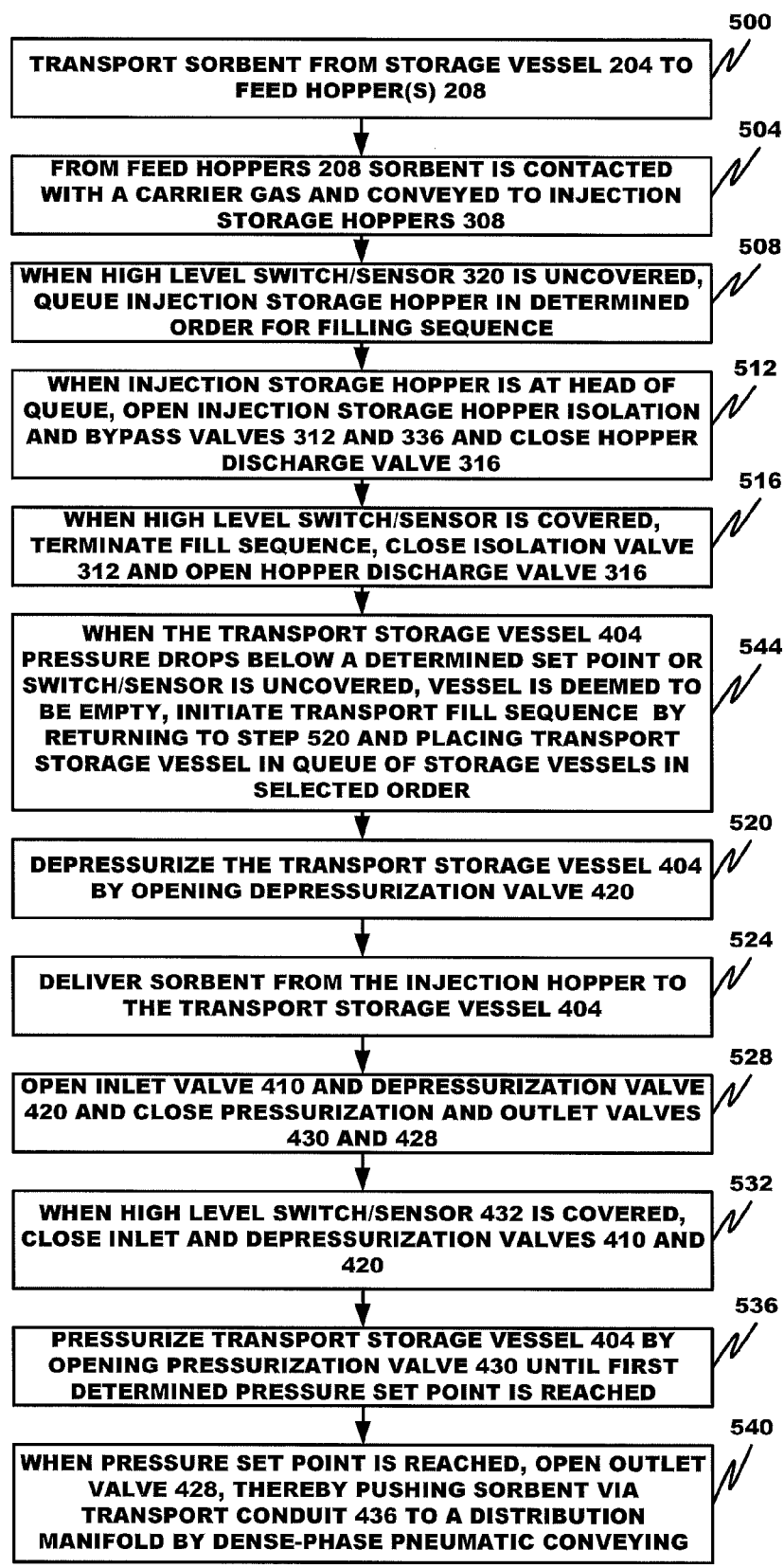
FIG. 5 is a flow chart of an exemplary operation of a controller.

Referring now to FIGS. 4 and 5, the inlet valve(s) 410 and depressurization valve(s) 420 are normally closed when the outlet valve(s) 428 and pressurization valve(s) 430 and is/are open (in which state the system 400 is dense-phase pneumatically transporting sorbent through the conduit 436) to a manifold for distribution to injection lances), and the outlet valve(s) 428 and pressurization valve(s) 430 are normally closed when the inlet valve(s) 410 and depressurization valve(s) 420 are open (in which state the injection storage system 300 is being filled).

When the high (level) switch/sensor 432 is uncovered by sorbent removal from the transport storage vessel(s) 404 and/or when the operating pressure in the storage vessel 404 drops below a determined set point, the controller 304 deems the vessel 404 to be empty and enqueues, in step 520, the respective injection storage system 300 in a determined order for initiation of the filling sequence. One exemplary order is based on first-in-first-out in which the various systems 400 requiring a filling operation are ordered based on the time of receipt of a request to initiate the filling sequence, with the latest time-stamped request going next and the earliest time-stamped request going last. Other sequences will be known to those of ordinary skill in the art.

The transport storage vessel level high and/or low switch/sensor(s) is/are optional. The vessel can be filled off a predetermined fill time in place of a level switch.

When, in step 524, the selected system 400 is at the head of the queue, the controller 304 instantiates a filling operation. The controller 304 closes the pressurization and outlet valves 430 and 428, respectively and then opens the depressurization valve(s) 420 and the inlet valve(s) 410 (to depressurize the vessel 404 and prevent back pressure to the system 300 via conduit 408) (step 528), thereby enabling sorbent transfer, via conduit 408 and by gravity from the injection storage hopper, to the vessel 404. When the high switch/sensor is covered (step 532), the controller 304 terminates the filling sequence and commands the depressurization and inlet valves 420 and 410, respectively, to close (thereby blocking sorbent from entering the vessel 404) and the pressurization and outlet valves 430 and 428, respectively, to open (steps 536 and 540) to enable sorbent transfer to the corresponding injector manifold(s). The transport vessel pressurizes via compressed air that is controlled by the pressurization valve until a known pressure set point is reached. Once the set pressure is reached, the outlet valve opens pushing sorbent via transport pipe to the distribution manifold by dense phase pneumatic conveying. When the injection location is in vacuum, the vessel will pressurize and open the outlet valve simultaneously.

Transfer, as noted, is performed by dense-phase pneumatic conveyance. The superficial operating gas flow velocity in the conduit 224 is typically less than the saltation velocity plus qualification for the particle slip velocity. By way of example, the target material velocity, for a desired particle mass flow rate of 2,000 lb/hr for a 32 micrometer (um) particle being conveyed in a 3-inch ID pipe and a conveying fluid temperature of 70° F., ranges from about 500 fpm to about 2000 fpm, and more typically ranges from about 1000 fpm to about 1,500 fpm. Because material velocity varies based on location in the flow path (e.g., material velocity is slower upstream but speeds up as the entraining gas decompresses and moves the material downstream), the target velocities in the preceding sentence represent average target velocities over the entire flow path.

The filling sequences of the various systems 300 and 400 can be performed independently or dependently depending on the application. Independent operation means that each system 300 and 400 operates discretely and independently of operations and sensed conditions of the other systems; that is, filling operations of interconnected systems 300 and 400 are performed at different times or asynchronously. Dependent operation means that each system 300 and 400 operates based on operations and/or conditions of the other systems; that is, filling operations of interconnected systems are performed concurrently or synchronously. The filling sequences are typically logically structured as discrete unit operations.

Figure 6:
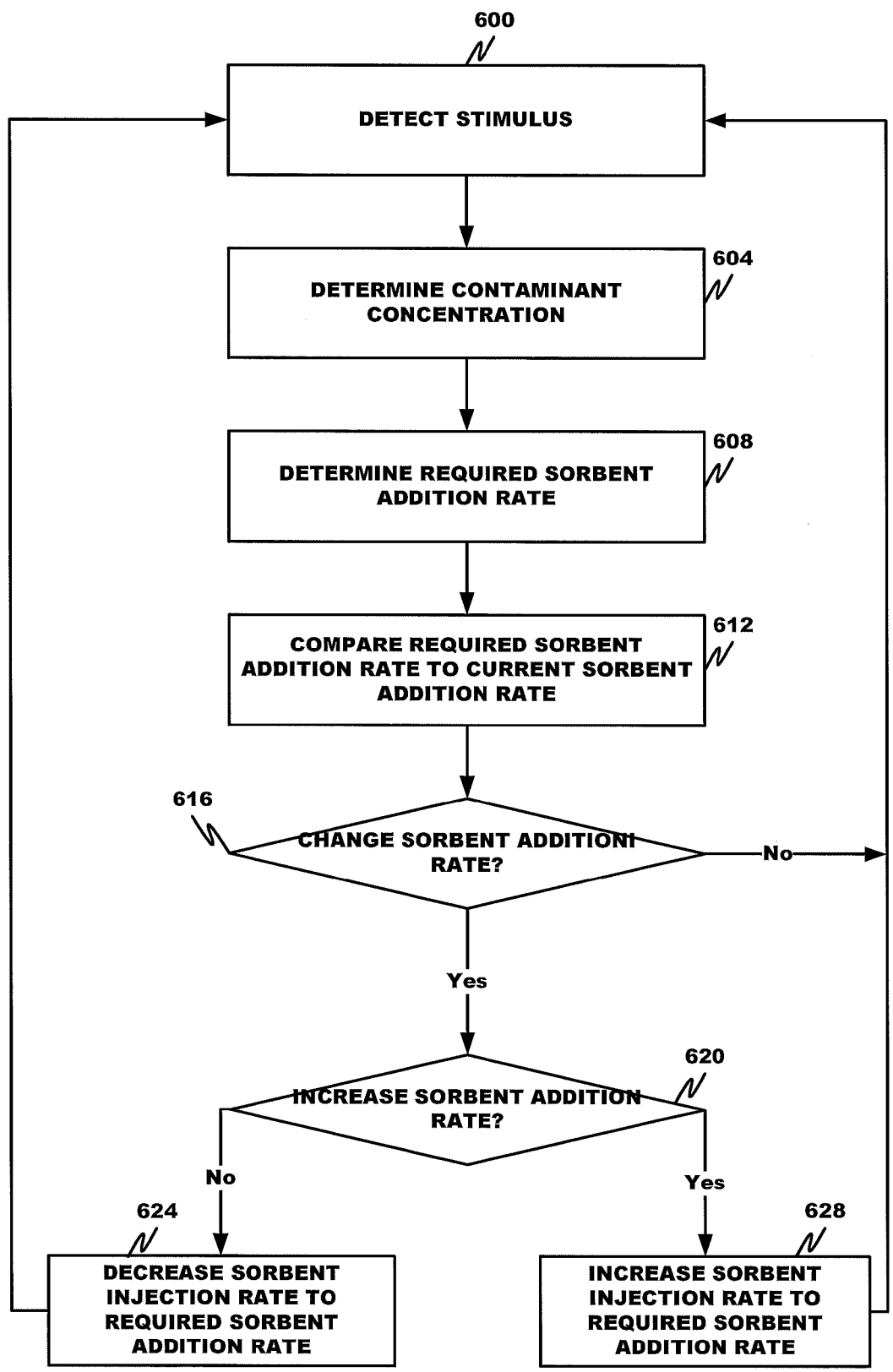
FIG. 6 is a flow chart of an exemplary operation of the controller.

An operation of the controller 304 will now be discussed with reference to FIG. 6.

In step 600, the controller 304 detects a stimulus, such as receipt of a sensor signal relating to a contaminant concentration in the contaminated gas stream 108 or treated gas stream. The concentration is commonly received from an-line contaminant sensor and/or monitor (not shown), such as a residual gas analyzer, gas chromatography, mass spectrometer, flame ionization detector, nondispersive infrared detector, photoionization detector, catalytic sensor, holographic sensor, thermal conductivity detector, and the like. A positive or negative threshold change in contaminant concentration in the contaminated gas stream 108 or treated gas stream can also be a stimulus. Minor changes (within a determined threshold) typically do not act as a stimulus.

In step 604, the controller 304, determines, based on the signal, the contaminant concentration in the corresponding gas stream.

In step 608, the controller 304, determines a required sorbent concentration and/or addition rate to realize a determined degree of contaminant removal. This conversion is typically done using a lookup table providing the sorbent concentration and/or addition rate as a function of the detected contaminant concentration. Sorbent addition rate can also be determined by other techniques, such as by counting and controlling the number of batches of sorbent added per hour.

In step 612, the controller 304 compares the required sorbent addition rate to a current sorbent addition rate.

In decision diamond 616, when the absolute value of the difference between the required and current rates is less than a selected threshold, no change is made. When the difference between the required and current rates is more than the selected threshold, the rate is changed.

When no change is required, the controller 304 returns to step 600.

When a positive or negative change to the sorbent addition rate is required, the controller 304 proceeds to decision diamond 620.

In decision diamond 620, the controller 304 determines whether the difference is positive or negative. A negative difference indicates that the required rate is less than the current rate while a positive difference indicates that the required rate is more than the current rate. In the former case, the controller 304, in step 624, decreases the sorbent injection rate to the required sorbent addition rate. In the latter case, the controller 304, in step 628, increases the sorbent addition rate to the required sorbent addition rate. After either step, the controller 304 returns to step 600.

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

A test was conducted of a sorbent conveying system as described in this disclosure. The tested system design utilized a combination of dilute phase and dense phase conveying to inject the sorbent into a bag house compartment. The dense phase test unit used to demonstrate the dense phase conveying concept used powered activated carbon (PAC).

Figure 7:
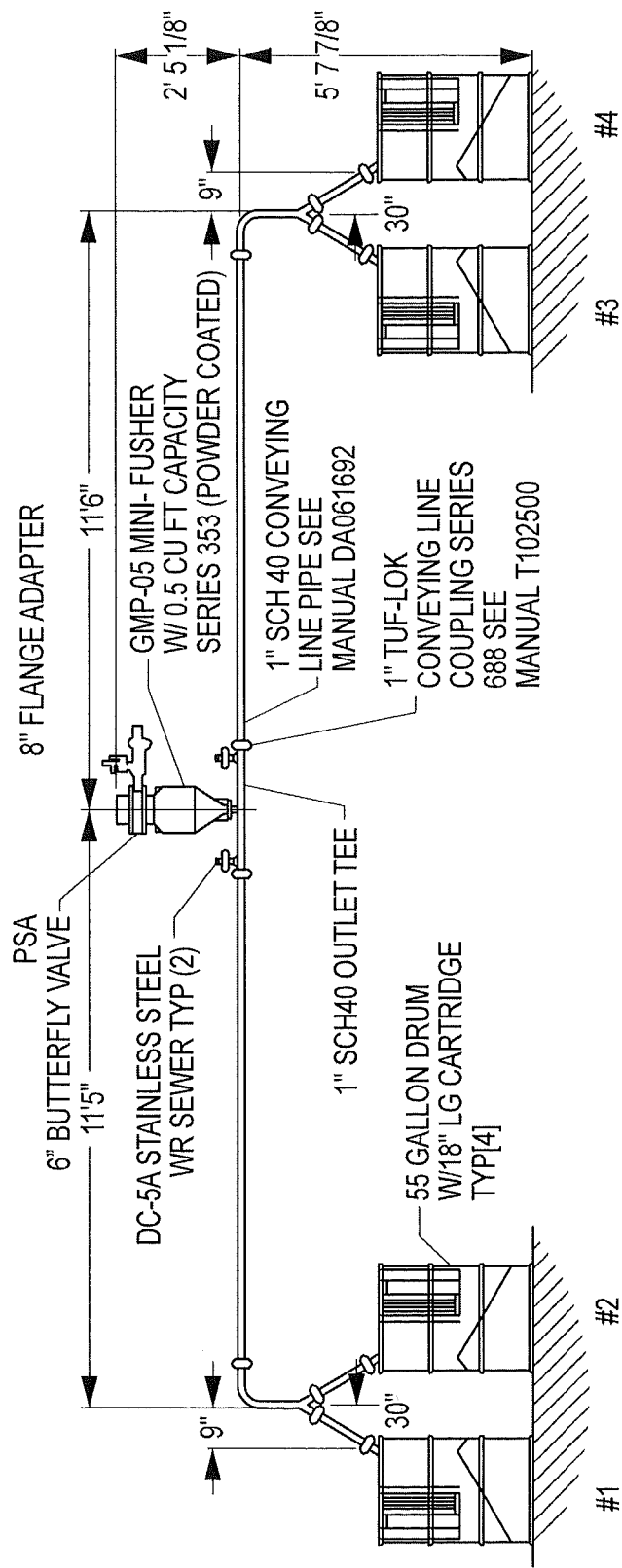
FIG. 7 illustrates an experimental apparatus.
Figure 8:
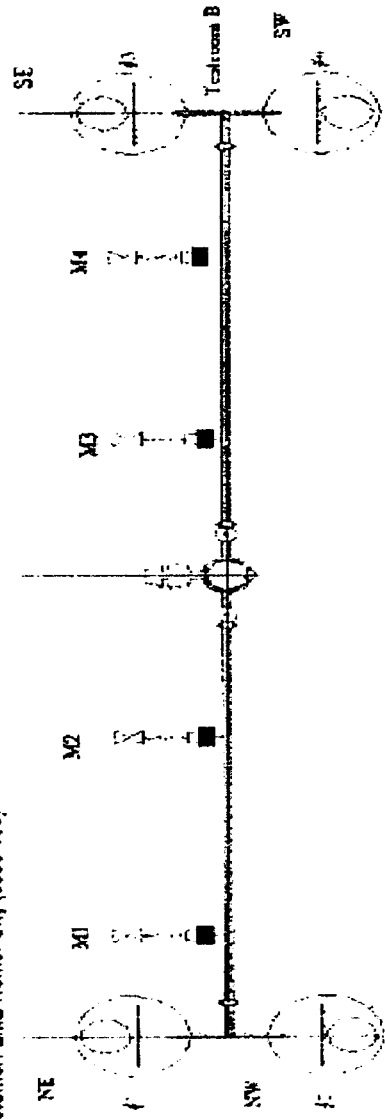
FIG. 8 is a dynamic four-way split conveyance system.

Referring to FIGS. 7-8, the system was loaded through a 6" pneumatic inflatable seat butterfly valve into a dense phase transport vessel from a storage hopper. The transport vessel had a 0.5 cubic foot design capacity. The transport vessel outlet split into two conveying lines. The conveying line had stainless steel ½" air injectors. Each of the conveying lines was a 1" SCH 80 stainless steel pipe connected with couplings. The conveying distance is 11'6" to simulate the distance to each side of the bag house compartment. After the horizontal run of piping, the conveying passed through a machined 60 degree wye. After the wye, the conveying line turned vertically down 90 degrees into two different 55 gallon collection drums. Each of the collection drums had a single cartridge filter without reverse pulse cleaning.

The PAC was loaded into the dense phase hopper above the transport vessels. The Sorbent was loaded into an injector vessel as described herein.

The material was weighed in each of the collection drums. The material weights were recorded to determine distribution percentage.

The requirement for dust collection in the collection drums resulted with a positive pressure injection area which is not representative of the injection environment. It is possible each dust collection cartridge may have different pressures which will affect the results. The injection environment was under a negative pressure, which should aid distribution providing vacuum is equal at the injection locations.

The features and functionality tested were as follows:
  Overall rate and turn down of the system from 35-85 lb/hr;
  Air consumption;
  Compressor requirements;
  Surge tank requirements; and
  Estimated material exit velocity.

The test goal was to achieve better than 25% distribution of PAC after the first split.

During each batch, the following data points were collected:
  Weight of each of the collection drums material (lb);
  Set pressure (psi);
  Average back pressure (psi);
  Average air consumption (SCFM); and
  Average cycle time.

Below is the data collected during the test as well as calculations on the distribution percentages between each of the splitters. Each run consisted of 8 transports. In the table below (M1-M4) is the set point on the flow control valve for the air injectors.

The table below shows the distribution split in percent by weight. Tee 1 was the initial split leaving the transporter, wye 1 is the split between drum 1 and 2, and wye 2 is the split between drum 3 and 4.

| Batch Number | Tee 1 %, % | Wye 1 %, % | Wye 2 %, % |
| --- | --- | --- | --- |
| 1 | 50.7, 49.3 | 56.8, 43.2 | 55.6, 44.4 |
| 2 | 51.6, 48.4 | 56.3, 43.8 | 56.7, 43.3 |
| 3 | 48.5, 51.5 | 53.4, 46.6 | 52.9, 47.1 |
| 4 | 51.2, 48.8 | 55.7, 44.3 | 52.2, 47.8 |
| 5 | 49, 51 | 51.2, 48.8 | 52.8, 47.2 |
| 6 | 50.1, 49.9 | 52.6, 47.4 | 53, 47 |
| 7 | 49.5, 50.5 | 58.8, 41.2 | 53.8, 46.2 |
| 8* | 51.7, 48.3 | 54.9, 45.1 | 49.6, 50.4 |
| 9* | 50.6, 49.4 | 53.1, 46.9 | 46, 54 |
| 10* | 49.6, 50.4 | 55.1, 44.9 | 46.2, 53.8 |
| 11* | 50.2, 49.8 | 54.9, 45.1 | 54, 46 |
| 12** | 59.1, 40.9 | 50.8, 49.2 | 48.9, 51.1 |

*Test runs 8-11 were done at lower pressures to test the results of increased cycle times.
**Test run number 12 was ran as an experiment to see what would happen if the air savers were not used. This data point should not be considered as representative of the current system design.

The main split through the Tee after the transport vessel was the primary concern since it conveys to opposite sides of the bag house compartment. The system performed better than expected with less than a 2% average variance at the first split. The average distribution between the different injection locations on each side was slightly higher at around 10%. This may improve with more consistent negative pressure conditions which will aid material flow versus cartridges in the drums with inconsistent differential pressures. It was also concluded that the system does need the air injectors to have the best distribution. An additional test will be run to determine the duration of open time for the inlet valve to reliably pass the design requirement of 0.5 cubic feet and other various capacities into the injection vessel.

A number of variations and modifications of the disclosure can be used. It would be possible to provide for some features of the disclosure without providing others.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   determining, by a controller, that an amount of additive in a vessel has dropped below a determined level in response to introduction of the additive into a contaminated gas stream;
   closing, by the controller, an outlet valve to terminate supply of the additive to one or more injectors positioned in the contaminated gas stream;
   opening, by the controller, an inlet valve to cause the additive to be introduced into the vessel; and
   when the additive amount is at least the determined level, closing, by the controller, the inlet valve and opening, by the controller, the outlet valve to supply the additive to the one or more injectors.

2. The method of claim 1, wherein the vessel comprises multiple vessels, each with separate outlet and inlet valves, and further comprising:
   in response to the determining step, closing, by the controller, a pressurization valve and opening a depressurization valve to reduce an operating pressure of the vessel; and
   when the additive amount is at least the determined level, closing, by the controller, the depressurization valve and opening the pressurization valve to pressurize the vessel.

3. The method of claim 1, wherein the controller determines at a first time that an additive amount in a first vessel has dropped below a determined level in response to introduction of additive into the contaminated gas stream and at a later second time that an additive amount in a second vessel has dropped below a determined level in response to introduction of additive into the contaminated gas stream and wherein the controller performs the steps of claim 1 at different times with respect to the first and second vessels.

4. The method of claim 1, wherein the determination is made by receiving a signal from a level switch and/or sensor, by passage of time, and/or by an operating pressure of the vessel falling below a selected pressure set point.

5. The method of claim 1, wherein the additive is a sorbent, wherein the vessel is a transport storage vessel, and further comprising:
   transporting, by dense-phase pneumatic conveyance, an additive from the transport storage vessel to the one or more injectors positioned in the contaminated gas stream; and
   injecting the additive into the contaminated gas stream to cause removal of a contaminant.

6. The method of claim 5, wherein the contaminated gas stream is derived from combustion of a high alkali, high iron, and/or high sulfur coal, wherein the contaminant is one or more of a sulfur oxide, a nitrogen oxide, hydrogen sulfide, hydrochloric acid, hydrofluoric acid, mercury, a halogen, a particulate, and a carbon oxide, and wherein the additive is a sorbent that is one or more of an alkaline material, powdered activated carbon, trona, a halogen, a halide, and a metal oxide.

7. The method of claim 1, wherein the vessel is one or more of a storage vessel and hopper and further comprising:
   conveying, by dilute-phase pneumatic conveyance, additive from the one or more of a storage vessel and hopper to an injection transport vessel; and
   transporting the additive from the injection transport vessel to the transport storage vessel.

8. The method of claim 7, wherein a superficial operating gas flow velocity during dilute-phase pneumatic conveyance is at least the saltation velocity and, during dense-phase pneumatic conveyance, is less than the saltation velocity.

9. A system for performing the steps of claim 5, wherein the vessel is a transport storage vessel and wherein the sorbent is an additive, the system comprising:
   the controller;
   the transport storage vessel to store an additive;
   the one or more injectors configured to introduce the additive into a contaminated gas stream to cause removal of a contaminant; and
   a conduit in fluid communication with the transport storage vessel and the one or more injectors and configured to transport, by dense-phase pneumatic conveyance, the additive from the transport storage vessel to the one or more injectors for additive introduction into the contaminated gas stream.

10. The system of claim 9, further comprising:
    one or more storage vessels for longer term storage of the additive;
    a first feeder for transporting the additive from the one or more storage vessels into a hopper; and
    a second feeder for transporting the additive from the hopper to a conduit for dilute-phase pneumatic conveyance of the additive to an injection storage hopper.

11. The system of claim 10, further comprising:
    an isolation valve to enable and disable supply of additive to the injection storage hopper;
    a first discharge valve to enable and disable supply of additive, via the conduit, to the transport storage vessel;
    a bypass line to direct additive around the discharge valve and to the injection transport vessel; and
    a second discharge valve to enable and disable supply of additive, via the bypass line, to the injection transport vessel.

12. The system of claim 11, further comprising:
the inlet valve, in fluid communication with the injection storage vessel, to enable and disable supply of additive to the transport storage vessel;
a vent line to depressurize the transport storage vessel;
a depressurization valve in fluid communication with the vent line to enable and disable depressurization of the transport storage vessel;
a pressurization line to pressurize the transport storage vessel;
a pressurization valve in fluid communication with the vent line to enable and disable pressurization of the transport storage vessel; and
the outlet valve to enable and disable supply to the one or more injectors.

13. A tangible, non-transient computer readable medium, comprising instructions that, when executed by a microprocessor, perform the steps of claim 1.

14. The medium of claim 13, further comprising the operations:
in response to the determining operation, closing a pressurization valve and opening a depressurization valve to reduce an operating pressure of the vessel; and
when the additive amount is at least the determined level, closing the depressurization valve and opening the pressurization valve to pressurize the vessel.

15. The medium of claim 13, wherein the vessel comprises multiple vessels, each with separate outlet and inlet valves, and wherein a microprocessor determines at a first time that an additive amount in a first vessel has dropped below a determined level in response to introduction of additive into the contaminated gas stream and at a later second time that an additive amount in a second vessel has dropped below a determined level in response to introduction of additive into the contaminated gas stream and wherein the microprocessor performs the operations of claim 1 at different times with respect to the first and second vessels.

16. The medium of claim 13, wherein the determination is made by receiving a signal from a level switch and/or sensor, by passage of time, and/or by an operating pressure of the vessel falling below a selected pressure set point.

\* \* \* \* \*